(12) United States Patent
Buyanovskiy

(10) Patent No.: US 8,149,238 B2
(45) Date of Patent: Apr. 3, 2012

(54) METHOD AND SYSTEM FOR ADAPTIVE MAXIMUM INTENSITY PROJECTION RAY CASTING

(75) Inventor: Georgiy Buyanovskiy, Cupertino, CA (US)

(73) Assignee: Fovia, Inc., Palo Alto, CA (US)

( * ) Notice: Subject to any disclaimer, the term of this patent is extended or adjusted under 35 U.S.C. 154(b) by 1263 days.

(21) Appl. No.: 10/569,325

(22) PCT Filed: Aug. 18, 2004

(86) PCT No.: PCT/US2004/026819
§ 371 (c)(1),
(2), (4) Date: Sep. 15, 2006

(87) PCT Pub. No.: WO2005/020142
PCT Pub. Date: Mar. 3, 2005

(65) Prior Publication Data
US 2007/0040833 A1 Feb. 22, 2007

Related U.S. Application Data

(63) Continuation of application No. 10/642,797, filed on Aug. 18, 2003, now Pat. No. 7,301,538.

(51) Int. Cl.
*G06T 15/50* (2011.01)

(52) U.S. Cl. ........................................ 345/426

(58) Field of Classification Search .................. None
See application file for complete search history.

(56) References Cited

U.S. PATENT DOCUMENTS

| | | | |
|---|---|---|---|
| 4,694,404 A | 9/1987 | Meagher | |
| 4,719,585 A * | 1/1988 | Cline et al. | 345/424 |
| 5,123,084 A | 6/1992 | Prevost et al. | |
| 5,454,068 A | 9/1995 | Ramanujam | |
| 5,568,384 A | 10/1996 | Robb et al. | |
| 5,579,455 A | 11/1996 | Greene et al. | |

(Continued)

FOREIGN PATENT DOCUMENTS

JP H01-216490 A1 8/1989

(Continued)

OTHER PUBLICATIONS

Schreiner et al. A Fast Maximum-Intensity Projection Algorithm for Generating Magnetic Resonance Angiograms. IEEE Transactions on Medical Imaging. vol. 12. No. 1. Mar. 1993.*

(Continued)

*Primary Examiner* — Ulka Chauhan
*Assistant Examiner* — Robert Bader
(74) *Attorney, Agent, or Firm* — Ward & Zinna, LLC

(57) ABSTRACT

The adaptive MIP ray casting system first fragments a 3-D dataset into multiple sub-volumes and constructs an octree data structure with each sub-volume being associated with one node of the octree data structure. The system then establishes a 2-D image plane and selectively launches a plurality of rays towards the 3-D dataset, each ray adaptively interacting with a subset of the sub-volumes and identifies the maximum data value along the ray path. The maximum data value is then converted into a pixel value on the 2-D image plane. Finally, the system interpolates pixel values at those locations where no pixel value is generated by ray casting and thereby generates a 2-D image of the 3-D dataset.

1 Claim, 17 Drawing Sheets

U.S. PATENT DOCUMENTS

| | | | |
|---|---|---|---|
| 5,821,942 A * | 10/1998 | Avila et al. | 345/424 |
| 5,847,711 A | 12/1998 | Kaufman et al. | |
| 6,009,188 A | 12/1999 | Cohen et al. | |
| 6,028,608 A * | 2/2000 | Jenkins | 345/619 |
| 6,111,582 A | 8/2000 | Jenkins | |
| 6,373,487 B1 | 4/2002 | Culbertson et al. | |
| 6,512,517 B1 | 1/2003 | Knittel et al. | |
| 6,514,082 B2 | 2/2003 | Kaufman et al. | |
| 6,559,843 B1 | 5/2003 | Hsu | |
| 6,597,359 B1 | 7/2003 | Lathrop | |
| 6,816,167 B1 | 11/2004 | Rauchfuss | |
| 7,164,420 B2 * | 1/2007 | Ard | 345/423 |
| 2002/0113787 A1 | 8/2002 | Ray et al. | |
| 2004/0125103 A1 | 7/2004 | Kaufman et al. | |
| 2004/0236549 A1 | 11/2004 | Dalton | |
| 2005/0017971 A1 | 1/2005 | Ard | |
| 2005/0151736 A1 | 7/2005 | Schlegel et al. | |

FOREIGN PATENT DOCUMENTS

| | | | |
|---|---|---|---|
| JP | H07-121737 A1 | | 5/1995 |
| JP | 2000-348195 A1 | | 12/2000 |
| JP | 2000-357240 A1 | | 12/2000 |
| WO | WO 0163561 A1 * | | 8/2001 |
| WO | WO 02/061686 A1 | | 8/2002 |

OTHER PUBLICATIONS

Mroz et al. Interactive High-Quality Maximum Intensity Projection. Computer Graphics Forum. vol. 19. No. 3. Sep. 2000.*

Prokop et al. Use of Maximum Intensity Projections in CT Angiography—A Basic Review. RadioGraphics. vol. 17. 1997.*

M. Shinya, T. Takahashi, S. Naito "Principles and Applicationg of Pencil Tracing", Jul. 1987, ACM, Computer Graphics, vol. 21, No. 4, pp. 45-54.*

Don P. Mitchell, "The Antialiasing Problem in Ray Tracing", Aug. 1990, ACM, SIGGRAPH '90 Course Notes, vol. 24.*

John Danskin and Pat Hanrahan, "Fast Algorithms for Volume Ray Tracing", Oct. 20, 1992, ACM, Proceedings of the 1992 Workshop on Volume Visualization, pp. 91-98.*

Lori A. Freitag and Raymond M. Loy, "Adaptive, Multiresolution Visualization of Large Data Sets using a Distributed Memory Octree", Nov. 19, 1999, ACM/IEEE Supercomputing 99 Conference.*

James Painter and Kenneth Sloan, "Antialiased Ray Tracing by Adaptive Progressive Refinement", Jul. 1989, ACM, Computer Graphics, vol. 23, No. 3, pp. 281-288.*

Marc Levoy, "Volume rendering by adaptive refinement", Jan. 1990, Springer-Verlag, The Visual Computer, vol. 6, No. 1, pp. 2-7.*

Marc Levoy and Ross Whitaker, "Gaze-Directed Volume Rendering", Mar. 1990, ACM, SIGGRAPH Computer Graphics, vol. 24, Issue 2, pp. 217-223.*

Mark R. Bolin and Gary W. Meyer, "A Perceptually Based Adaptive Sampling Algorithm", Jul. 1998, ACM SIGGRAPH, Proceedings of the 25th annual conference on Computer graphics and interactive techniques, pp. 299-309.*

Don P. Mitchell, "Generating Antialiased Images at Low Sampling Densities", Jul. 1987, ACM, Proceedings of the 14th annual conference on Computer graphics and interactive techniques, pp. 65-72.*

Mark E. Lee, Richard A. Redner, and Samuel P. Uselton, "Statistically Optimized Sampling for Distributed Ray Tracing", Jul. 1985, ACM SIGGRAPH Computer Graphics, vol. 19, No. 3, pp. 61-68.*

United States Patent and Trademark Office, PCT Internatioonal Search Report and Written Opinion for PCT?US04/26812, dated Apr. 7, 2006.

Levoy, *Efficient Ray Tracing of Volume Data*, ACM Transactions on Graphics, vol. 9, No. 3, Jul. 1990, pp. 245-261.

Foley, et al., *Computer Graphics: Principles and Practice Second Edition in C.*; Addison-Wesley Publishing Company, Inc., 1996, p. 701-712; 721-731; 782-785.

Pfister, *Architectures for Real-Time Volume Rendering*, Mitsubishi Electric Research, Aug. 7, 1998.

United States Patent and Trademark Office, PCT International Search Report and Written Opinion for PCT/US04/026819, dated Mar. 11, 2005.

Office action dispatched Jun. 21, 2010 in Japanese application 2006-524009 for "Method and System for Adaptive Direct Volume Rendering".

Office action dispatched Jul. 20, 2010 in Japanese patent application 2006-524013 for "Method and System for Adaptive Maximum Intensity Projection Ray Casting".

* cited by examiner

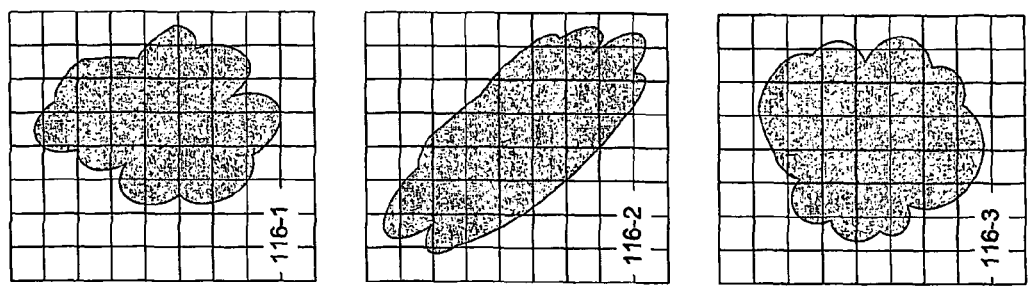
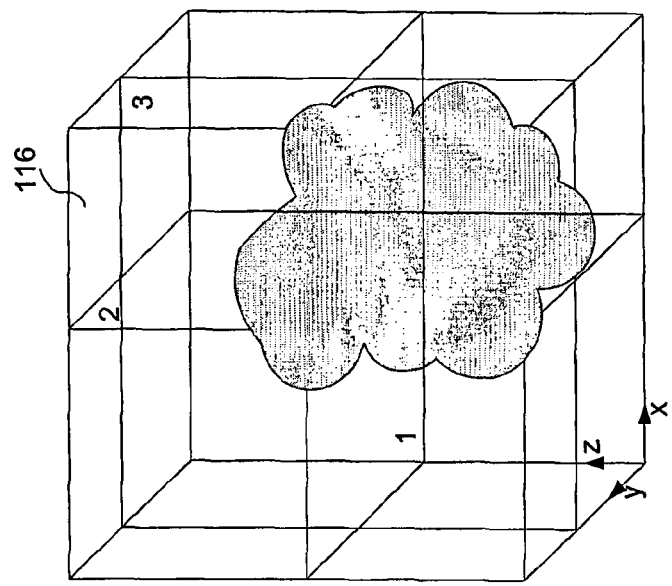
Fig. 1D
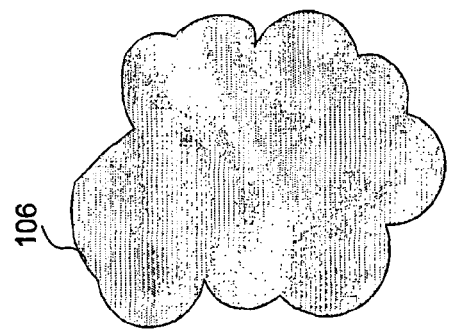

METHOD AND SYSTEM FOR ADAPTIVE MAXIMUM INTENSITY PROJECTION RAY CASTING

CROSS-REFERENCE RELATED APPLICATIONS

The present application is a U.S. National Phase Application of International Application PCT/2004/026819 (filed Aug. 18, 2004) which claims the benefit of U.S. application Ser. No. 10/642,797 (filed Aug. 18, 2003), all of which are hereby incorporated by reference in their entirety.

FIELD OF THE INVENTION

The present invention relates generally to the field of volume data rendering, and more particularly, to a method and system for rendering a volume dataset using adaptive data representation, ray casting, and data interpolation techniques.

BACKGROUND OF THE INVENTION

Visualization of the internal structure of 3-D objects on a 2-D image is an important topic within the field of computer graphics and has been applied to many industries, including medicine, geoscience, manufacturing, and drug discovery.

For example, a CT scanner can produce hundreds or even thousands of parallel 2-D image slices of a patient's body including different organs, e.g., a heart, each slice including a 2-D array of data values and each data value representing a scalar attribute of the body at a particular location, e.g., density. All the slices are stacked together to form an image volume or a volumetric dataset of the patient's body with the heart embedded therein. A 2-D image showing the 3-D structural characteristics of the heart is an important aid in the diagnosis of cardiovascular disease.

As another example, the oil industry uses seismic imaging techniques to generate a 3-D image volume of a 3-D region in the earth. Some important geological structures, such as faults or salt domes, may be embedded within the region and not necessarily on the surface of the region. Similarly, a 2-D image that fully reveals the 3-D characteristics of these structures is critical in increasing oil production.

Maximum intensity projection (MIP) ray casting is a technique developed for visualizing the interior of a solid region represented by a 3-D image volume on a 2-D image plane, e.g., a computer monitor. Typically, a plurality of rays are cast from a 2-D radiation plane into the image volume, each ray casting responsible for identifying the maximum data value (e.g., intensity) at a voxel within the image volume along its respective ray path and transferring it into an image value at a pixel on a 2-D image plane through a predefined screen transfer function. The image value is indicative of the 3-D characteristics of the objects embedded within the image volume encountered by the ray path, e.g., their shapes and orientations. The image values associated with the pixels on the 2-D image plane form an image that can be rendered on a computer monitor.

Going back to the CT example discussed above, even though a doctor can arbitrarily generate 2-D image slices of the heart by intercepting the image volume in any direction, no single image slice is able to visualize the whole surface of the heart. In contrast, a 2-D image generated through MIP ray casting of the CT image volume can easily reveal the 3-D characteristics of the heart, which is very important in many types of cardiovascular disease diagnosis. Similarly in oil exploration, MIP ray casting of 3-D seismic data can help petroleum engineers to determine more accurately the 3-D characteristics of underground geological structures of a region that are potential oil reservoirs and to increase oil production significantly.

Even though MIP ray casting plays a key role in many important fields, there are several technical challenges that need to be overcome to assure wide deployment of the MIP ray casting technique. First, MIP ray casting is a computationally expensive process. In order to produce a high quality 2-D image that can capture the 3-D characteristics of a 3-D target, MIP ray casting needs to process a large 3-D dataset, which usually means a large number of calculations. For example, it requires at least 140 million calculations to generate a 2-D image of $512^2$ pixels for a typical 3-D dataset of $512^3$ voxels using conventional MIP ray casting algorithms.

Moreover, many applications require that MIP ray casting of a 3-D dataset operate in real-time so that a user is able to view successive 2-D images of the 3-D dataset, each 2-D image having different viewing angles or visualization parameters, without a significant delay. In medical imaging, it is generally accepted that a sequential 2-D image rendering of at least six frames per second meets the need for real-time interactive feedback. This is equivalent to nearly 1 billion calculations per second.

Given the limited computational capacity of modern computers, more efficient algorithms have been developed to reduce the computational cost of MIP ray casting. However, many of these algorithms achieve their efficiency by sacrificing the quality of the generated 2-D images. For example, a common problem with discrete representation of a continuous object is the jitter effect, which is most obvious when a user zooms in to view more details of the continuous object. If the jitter effect is not carefully controlled, it may significantly corrupt the quality of an image generated by a MIP ray casting algorithm.

Therefore, it would be desirable to develop a new MIP ray casting method and system that increase the rendering efficiency while having less or preferably imperceptible impact on the image quality.

SUMMARY OF THE INVENTION

A preferred embodiment of the present invention is an adaptive MIP ray casting method and system that generate high-quality 2-D images of 3-D objects embedded in a 3-D dataset using adaptive data representation, MIP ray casting, and data interpolation techniques.

The method and system first fragment the 3-D dataset into multiple sub-volumes of different sizes and construct a data structure, e.g., an octree, associating nodes of the octree with different sub-volumes of the dataset, each sub-volume also having a set of data value parameters characterizing the data value distribution within the sub-volume. In particular, the whole dataset is associated with the root node of the octree.

The method and system then cast a plurality of rays from a 2-D radiation plane towards the 3-D dataset. In one embodiment, commonly referred to as parallel projection, the plurality of rays are parallel to one other and each ray has a unique ray origin on the 2-D radiation plane. In another embodiment, commonly referred to as perspective projection, the plurality of rays are all launched from the same ray origin and each ray has a unique launching angle with respect to the 3-D dataset.

Each ray, having a certain cross-section or ray thickness and a predefined current data value record, interacts with a series of sub-volumes of the 3-D dataset along its ray path and updates the current data value record whenever it identifies a higher data value along the ray path. Specifically, during each interaction between the ray and a sub-volume, one or more comparisons are performed between the current data value record and a set of data value parameters associated with the sub-volume. If the current data value record is smaller than the data value at a voxel of the sub-volume on the ray path, e.g., the middle point of the ray path within the sub-volume, the data value at the voxel will replace the old record and become the current data value record. This process continues until the ray exits the 3-D dataset or certain predefined ray casting termination conditions have been satisfied, identifying the maximum data value record of the 3-D dataset on the ray path. The maximum data value record is translated into a pixel value on a 2-D image plane in accordance with a predefined screen transfer function. The pixel values on the 2-D image plane associated with the plurality of rays constitute a 2-D image illustrating the 3-D internal structures embedded in the 3-D dataset.

There are two competing requirements for the choice of an appropriate sub-volume that interacts with a ray. On the one hand, a large sub-volume can significantly reduce the computational cost of the ray casting, rendering the method and system more efficient; on the other hand, a small sub-volume can characterize the 3-D internal structures more accurately, producing an image of higher quality. The method and system has to strike a balance between these two competing goals by selecting a sub-volume that meet certain predefined conditions, e.g., that the difference between the maximum and minimum data values of a sub-volume is smaller than a predefined threshold. In one embodiment, the whole dataset associated with the root node of the octree is first selected to interact with the ray. However, since the set of data value parameters associated with the root node rarely captures the 3-D internal structures embedded in the 3-D dataset sufficiently, the dataset often has to be further fragmented into smaller sub-volumes, and one of the smaller sub-volumes that is closest to the ray origin along the ray path and associated with a child node of the root node is then examined to determine if it meets the predefined conditions. This fragmentation and examination process repeats recursively until a sub-volume of desired size is identified.

Once a sub-volume is finally chosen for interacting with a ray, the method and system estimate the data value at a particular location in the sub-volume that is on the ray path through tri-linear interpolation of known data values surrounding that particular location. If the estimated data value is greater than the ray's current data value record, the estimated data value is assigned to the ray as its new current data value record. Otherwise, the ray's current data value record remains unchanged. Following that, if the ray is still inside the 3-D dataset, the method and system identify another sub-volume of appropriate size next to the chosen one and farther along the ray path; a new estimated maximum data value is determined and the estimation continues.

The computational cost and the image resolution of a MIP ray casting algorithm are determined primarily by the number and density of rays cast from a 2-D radiation plane. Given a limited number of rays that can be handled by modern computer hardware within a reasonable time period, the method and system optimize the locations of the ray origins on the 2-D radiation plane such that the pixel values associated with those rays on the 2-D image plane can effectively capture the characteristics of the 3-D internal structures embedded within the 3-D dataset.

In one embodiment, four rays are first launched from four corners of the 2-D radiation plane. After getting the four pixel values at the four corners of the 2-D image plane, the method and system check the variation of the values against a predefined imaging error threshold. If the variation is above the threshold, one more ray is launched from the center of the radiation plane, thereby dividing the 2-D image plane into four sub-planes. Variations of the pixel values within each sub-plane are further checked against the predefined imaging error threshold. Any sub-plane whose variation is above the threshold is further divided recursively until the variation of any sub-plane is below the threshold.

Finally, the method and system estimate a value at each pixel on the 2-D image plane that is not associated with a ray based on the surrounding pixel values on the 2-D image plane. In one embodiment, those pixel values are results of bi-linear interpolation of pixel values at the four corners of a smallest sub-plane that have met the predefined imaging error threshold.

BRIEF DESCRIPTION OF THE DRAWINGS

The aforementioned features and advantages of the invention as well as additional features and advantages thereof will be more clearly understood hereinafter as a result of a detailed description of preferred embodiments of the invention when taken in conjunction with the drawings.

FIG. 1D depicts a 3-D object sampled by a 3-D dataset.

DESCRIPTION OF EMBODIMENTS

Figure 1A:
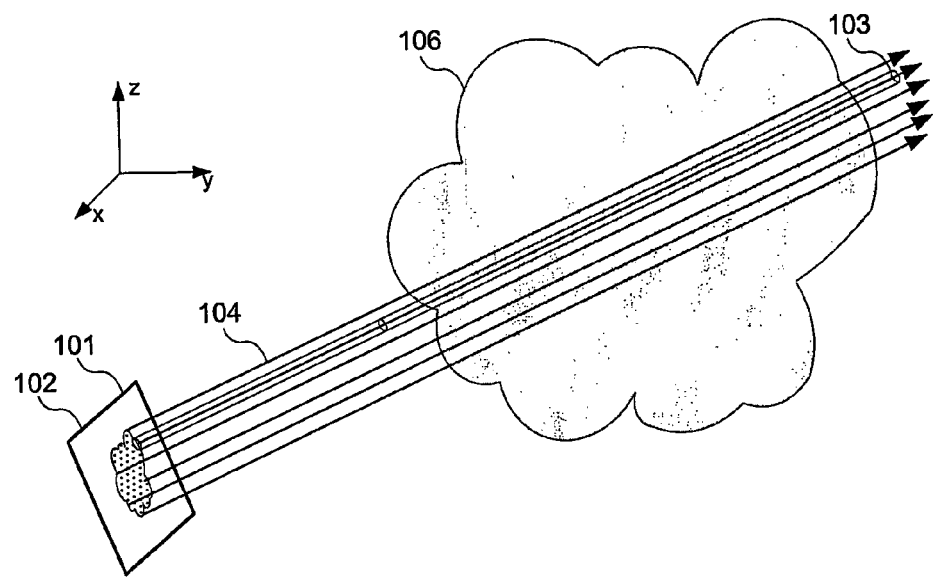
FIGS. 1A and 1B are two schematic illustrations of two embodiments of the present invention, parallel projection and perspective projection, respectively.
Figure 1B:
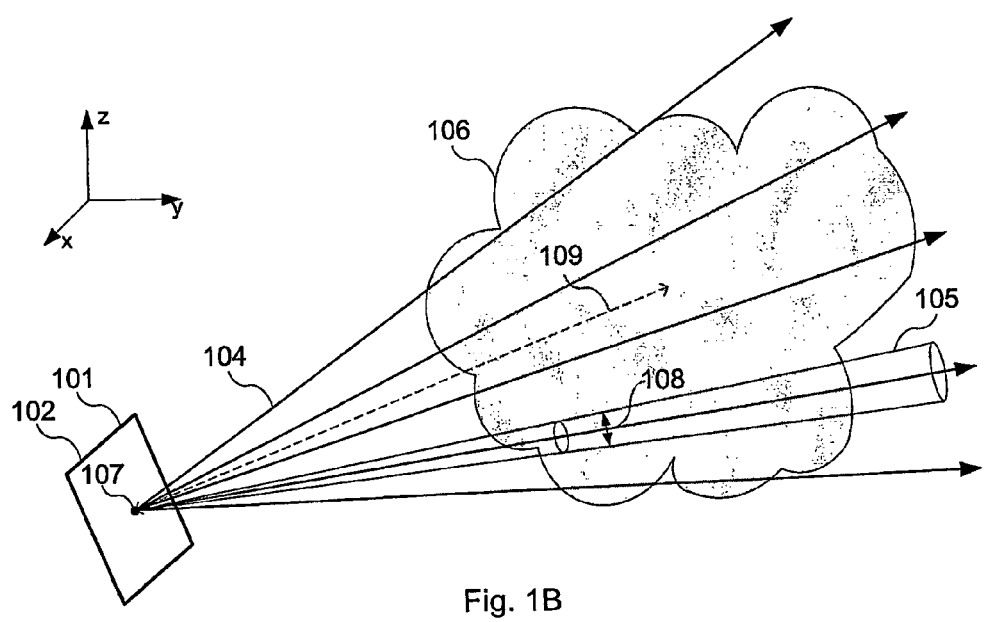

FIGS. 1A and 1B schematically illustrate two embodiments of the present invention, parallel projection and perspective projection, respectively. In a 3-D domain represented by the Cartesian coordinates (x, y, z), there is an image volume 106 containing one or more 3-D objects. MIP ray casting generates a 2-D image by casting a plurality of rays 104 into the image volume 106 and identifying the maximum data value along each ray path so as to visualize the 3-D characteristics of the 3-D objects on the 2-D image. Note that the shape of a ray in the context of the present invention is not a 1-D line, but a 3-D tube or cone depending on specific ray configurations discussed below.

In the embodiment shown in FIG. 1A, the plurality of rays 104 are launched from different locations on a radiation plane 102, each ray traveling in parallel with other rays 104 towards the image volume 106. The shape of a ray is a tube 103 that has a cross-section of constant size, also referred to as ray thickness. Different rays correspond to different pixels on a 2-D image plane 101, and each pixel value is determined by the maximum data value of the image volume identified on a corresponding ray path. Such MIP ray casting configuration is called "parallel projection". In the case of parallel projection, the image plane 101 can be located anywhere along the ray path. Illustratively, the image plane 101 can be co-incident with the radiation plane 102 as shown in FIG. 1A.

In the embodiment shown in FIG. 1B, the plurality of rays 104 are launched from an identical ray origin 107 on the radiation plane 102, each ray having a unique perspective angle with respect to the image volume 106. As a result, the shape of each individual ray is a cone 105 that has a cross-section of variable size that is a function of both a viewing angle 108 and a distance 109 between the ray origin 107 and the image volume 106. Similarly, different rays correspond to different pixels on a 2-D image plane 101, and each pixel value is determined by the maximum data value of the image volume identified on a corresponding ray path. Such MIP ray casting configuration is called "perspective projection". In the case of perspective projection, the image plane 101 can be located anywhere along the ray path between the ray origin 107 and the image volume 106. Illustratively, the image plane 101 can be co-incident with the radiation plane 102 as shown in FIG. 1B.

Generally speaking, the image resolution of a 2-D image generated by one of the two MIP ray casting configurations discussed above depends on the number of pixels per unit area. In practice, the total number of pixels per image is often a constant, e.g., $512^2$, which is dependent upon the number of pixels on a computer monitor. Therefore, higher image resolution in parallel projection is achieved by reducing the cross-section of a ray tube 103 and thereby increasing the number of pixels per unit area, and moving the radiation plane 102 along the ray paths away from or towards the image volume 106 does not affect the image resolution. In contrast, higher resolution in perspective projection is achieved by either reducing the viewing angle 108 or the distance 109 or both.

Figure 1C:
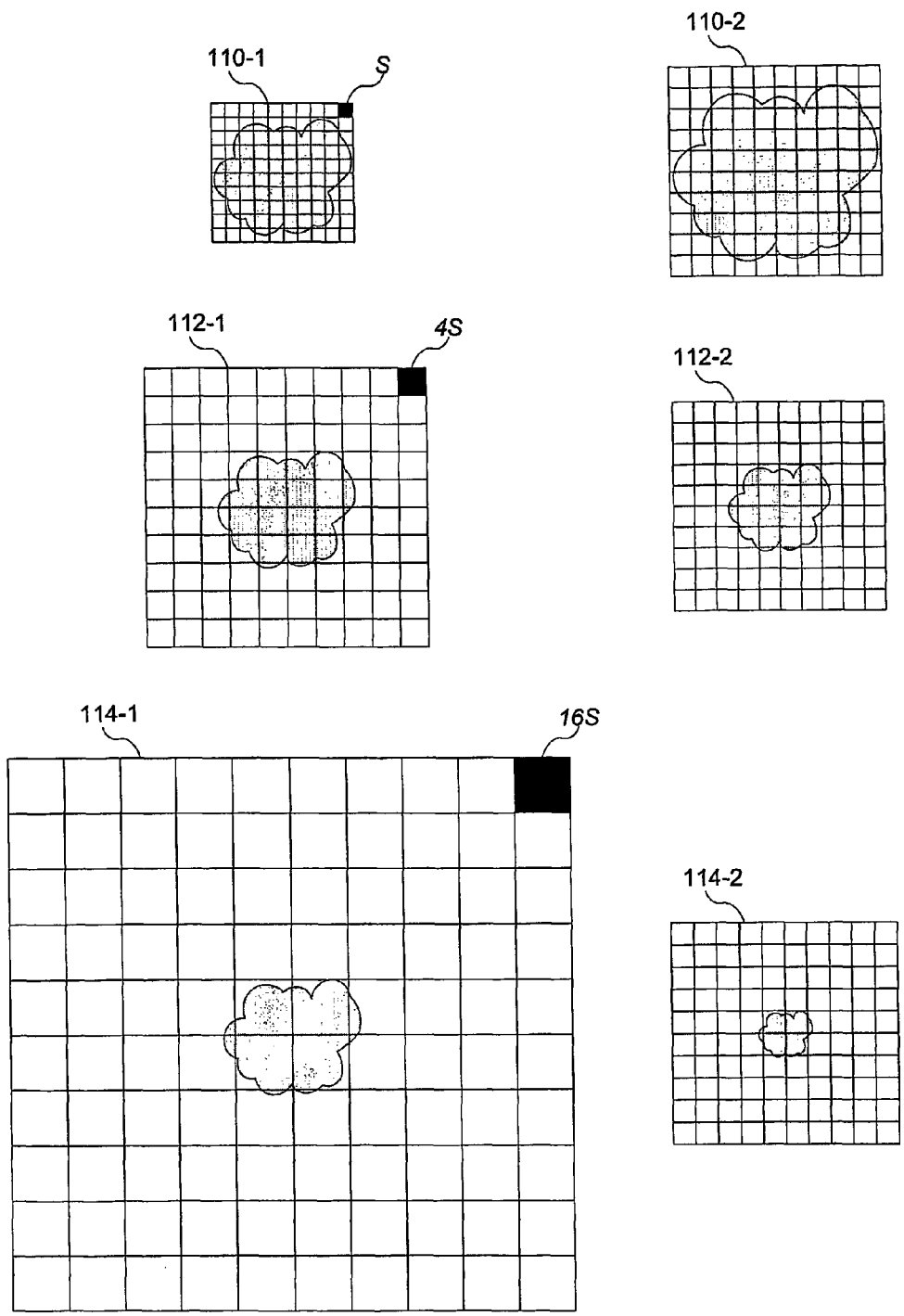
FIG. 1C depicts three 2-D images of a 3-D object at different image resolutions.

FIG. 1(C) illustrates how the image resolution changes as a function of ray thickness. For simplicity, each image has $10^2=100$ pixels, and the ray thicknesses of grids 110-1, 112-1 and grid 114-1 are S, 4S and 16S, respectively. As a result, the image generated on grid 114-2 has the lowest resolution, while the image generated on grid 110-2 has the highest resolution; and the image generated on grid 112-2 has intermediate resolution. Parallel projection achieves such magnification effect by reducing the size of the radiation plane and thereby increasing the density of ray origins on the radiation plane; and perspective projection achieves the same effect by moving the camera closer to the 3-D objects in the image volume or changing the camera's perspective angle.

The image volume 106 is usually represented by a 3-D dataset 116 as shown in FIG. 1D. Each voxel of the 3-D dataset has a scalar data value indicative of a physical attribute of the 3-D objects at a particular location. As shown in FIG. 1D, the 3-D dataset 116 has three orthogonal coordinates x, y and z. Along each coordinate, the dataset comprises a stack of 2-D data slices perpendicular to that coordinate. Each data slice includes a 2-D array of data values on a regular grid along the other two coordinates. For example, the three orthogonal data slices 116-1, 116-2 and 116-3 provide different (but limited) perspectives of image volume 106 in the directions z, x, and y, respectively.

Algorithm Overview

Figure 2:
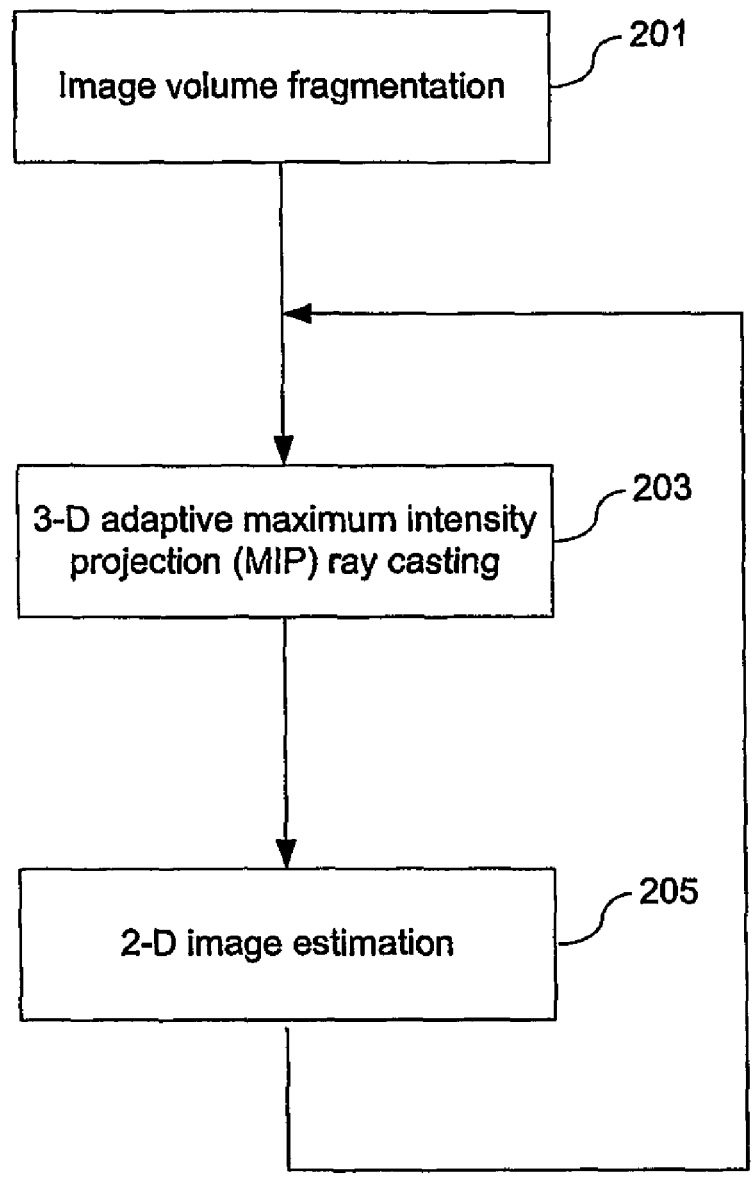
FIG. 2 is a flowchart depicting a MIP ray casting algorithm according to one embodiment of the present invention.

MIP ray casting according to one embodiment of the present invention comprises three major steps as shown in FIG. 2. At step 201, the method fragments an image volume into multiple sub-volumes of different sizes, each sub-volume being associated with a set of data parameters characterizing the data value distribution of the sub-volume. Details about this method are described below in connection with FIGS. 3A-3B and FIG. 4.

At step 203, the method performs a plurality of ray castings against the image volume from a radiation plane that is located a certain distance away from the center of the image volume and oriented in a certain direction with respect to the image volume. A ray cast from the radiation plane selectively interacts with a series of sub-volumes located along its ray path. The maximum data value on the ray path is converted into a pixel value in the image plane. More details about this process are provided below in connection with FIGS. 5-7.

At step 205, the method estimates pixel values at any other locations in the image plane using the pixel values generated at step 203 and presents a 2-D view of the 3-D objects embedded in the image volume. Steps 203 and 205 may be repeated numerous times to estimate more pixel values. In addition, steps 203 and 205 may be repeated to generate a series of new images when the radiation plane's location or direction changes or different visualization parameters are applied. Further details about this process are provided below in conjunction with FIGS. 8-10.

Image Volume Fragmentation

According to one embodiment of the present invention, an image volume is first fragmented into a set of sub-volumes and each sub-volume is further fragmented into smaller sub-volumes. Such recursive fragmentation continues until the smallest sub-volumes reach predefined size limits. All the sub-volumes, including the whole image volume, are associated with a hierarchical data structure, which provides a new representation of the original image volume.

Figure 3A:
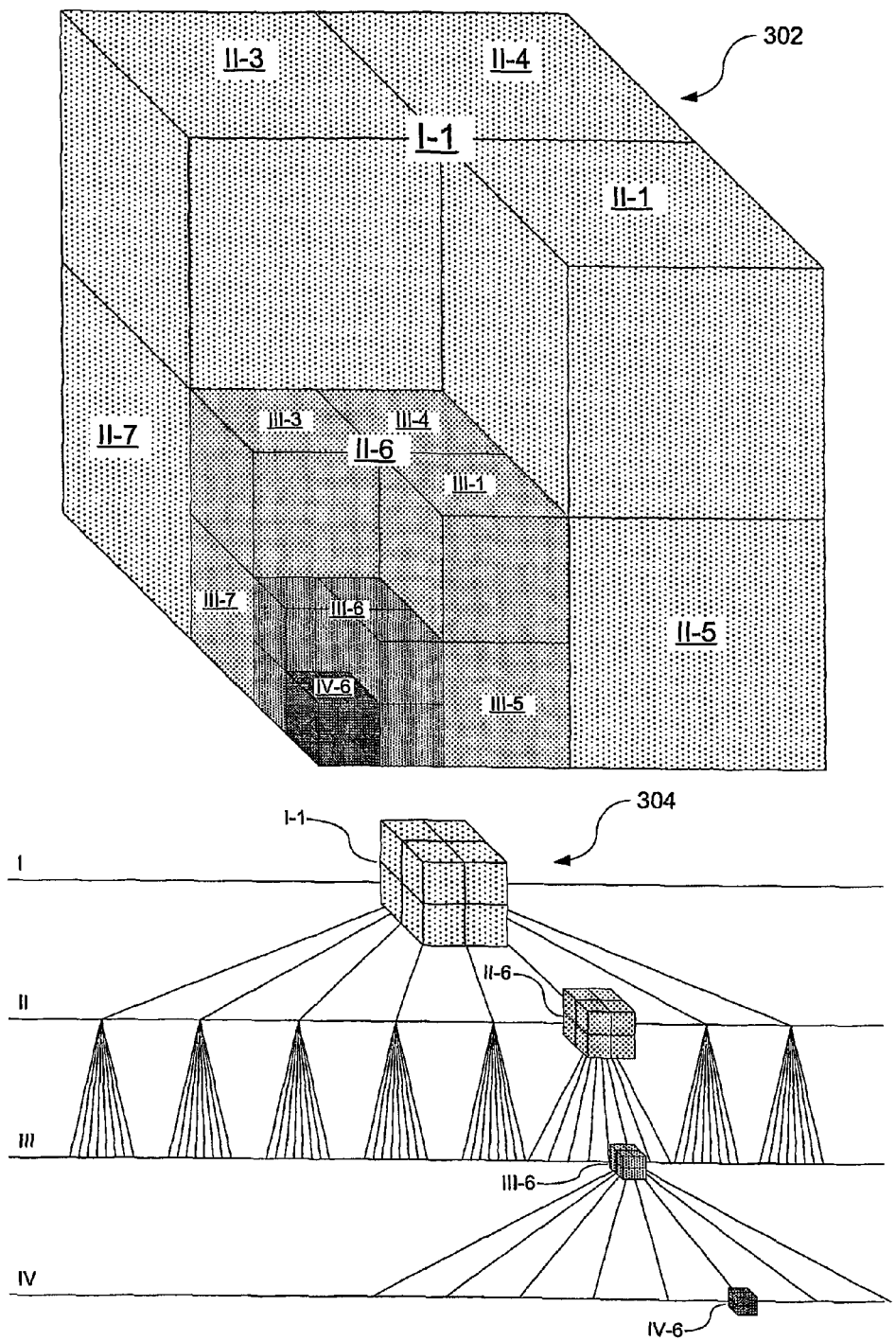
FIG. 3A depicts one embodiment of a 3-D dataset fragmentation.

FIG. 3A depicts a 3-D dataset 302 after being fragmented into a plurality of sub-volumes (e.g., 585 sub-volumes). These sub-volumes belong to four fragmentation levels I, II, III, and IV. For illustrative purposes, sub-volumes of different sizes, e.g., II-2, III-2 and IV-2, have been removed from FIG. 3A to expose other sub-volumes of smaller sizes. Each of the sub-volumes is associated with one node of an octree data structure 304 based on its size. Note that only a small subset of the sub-volumes are shown in the octree 304 to simplify the illustration.

Starting from fragmentation level I, the whole dataset 302 is treated as a single sub-volume I-1 and associated with the root node of octree 304. At fragmentation level II, dataset 302 is partitioned into eight sub-volumes of the same size; and each sub-volume, e.g., II-6, is associated with one intermediate node at level II of octree 304. At fragmentation level III, each sub-volume such as sub-volume II-6 is further divided into eight smaller sub-volumes III-1, III-2, . . . , and III-8; and similarly, each sub-volume, e.g., III-6, is associated with an intermediate node at level III. At fragmentation level IV, each sub-volume, such as sub-volume III-6, is partitioned into eight sub-volumes (including sub-volume IV-6), and each sub-volume at level IV is associated with a leaf node of octree 304. Since there are $8^0$ sub-volumes at level I, $8^1$ sub-volumes at level II, $8^2$ sub-volumes at level III, and $8^3$ sub-volumes at level IV, the dataset 302 is fragmented into a total of $$8^0+8^1+8^2+8^3=1+8+64+512=585$$

sub-volumes at four different fragmentation levels.

A sub-volume has an associated set of data parameters characterizing the data value distribution within the sub-volume. In one embodiment, the set of parameters includes at least three elements:

$V_{min}$ representing the minimum of the data value within the sub-volume;

$V_{avg}$ representing the average of the data value within the sub-volume; and $V_{max}$ representing the maximum of the data value within the sub-volume.

As illustrated in FIG. 3A, the image volume fragmentation is a recursive procedure. This procedure does not terminate until the smallest sub-volumes reach a predefined size limit. In one embodiment, this predefined size limit or the smallest sub-volume associated with an octree leaf node is a sub-volume having 2×2×2 cells or voxels of the image volume. A cell or voxel is the smallest unit of the image volume that has an associated data value. For example, if the image volume has $512^3$ cells which is typical in MIP ray casting and the smallest sub-volume has 2×2×2 cells, the image volume fragmentation process continues to fragmentation level IX and the number of smallest sub-volumes is $256^3$.

Figure 3B:
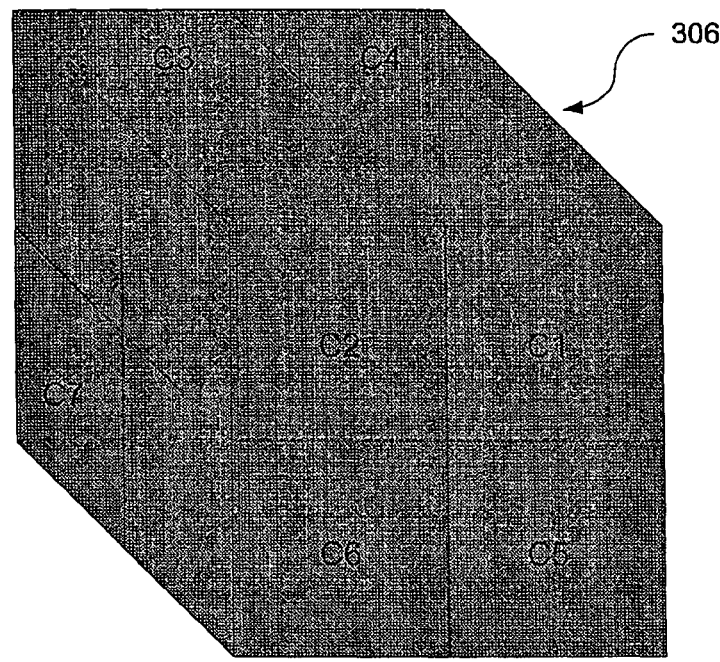
FIG. 3B depicts a sub-volume comprising eight cells or voxels and scalar data value distribution within a voxel or a cell.
Figure 3B:
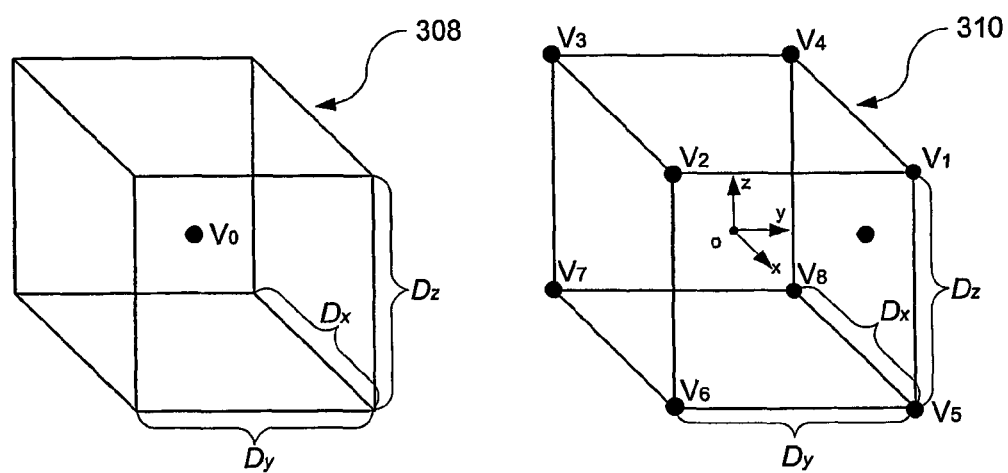

FIG. 3B shows a sub-volume 306 having eight cells or voxels, two cells or voxels next to each other in each of the three orthogonal directions. A voxel 308 is a cube that is centered at one sampled data value, e.g., $V_0$. The data value within a voxel is assumed to be constant and there may be a discontinuity of data value across the voxel's boundary. In contrast, a cell 310 is a cube of the same size that has eight sampled data values $V_1$-$V_8$, one at each corner of the cube. According to one embodiment, the data value at any point of the cell is approximated by tri-linear interpolation and there is no data value discontinuity across the cell's boundary. Note that the present invention applies equally to image volumes represented in either format, cell or voxel. For simplicity, the following discussion focuses on the cell representation as an example.

Referring again to FIG. 3B, there is a 3-D Cartesian coordinate system with its origin at the center of cell 310 and the lengths of the cell's three orthogonal edges are $D_x$, $D_y$, and $D_z$, respectively. The data value at any point of the cell 310, $V(x,y,z)$, can be expressed by tri-linear interpolation as a function of the data values at the eight corners of the cell 310, $V_1$-$V_8$, as follows:

$$V(x, y, z) =$$
$$\frac{V_1}{8}\left(1+\frac{2x}{D_x}\right)\left(1+\frac{2y}{D_y}\right)\left(1+\frac{2z}{D_z}\right)+\frac{V_2}{8}\left(1+\frac{2x}{D_x}\right)\left(1-\frac{2y}{D_y}\right)\left(1+\frac{2z}{D_z}\right)+$$
$$\frac{V_3}{8}\left(1-\frac{2x}{D_x}\right)\left(1-\frac{2y}{D_y}\right)\left(1+\frac{2z}{D_z}\right)+\frac{V_4}{8}\left(1-\frac{2x}{D_x}\right)\left(1+\frac{2y}{D_y}\right)\left(1+\frac{2z}{D_z}\right)+$$

-continued
$$\frac{V_5}{8}\left(1+\frac{2x}{D_x}\right)\left(1+\frac{2y}{D_y}\right)\left(1-\frac{2z}{D_z}\right)+\frac{V_6}{8}\left(1+\frac{2x}{D_x}\right)\left(1-\frac{2y}{D_y}\right)\left(1-\frac{2z}{D_z}\right)+$$
$$\frac{V_7}{8}\left(1-\frac{2x}{D_x}\right)\left(1-\frac{2y}{D_y}\right)\left(1-\frac{2z}{D_z}\right)+\frac{V_8}{8}\left(1-\frac{2x}{D_x}\right)\left(1+\frac{2y}{D_y}\right)\left(1-\frac{2z}{D_z}\right).$$

Figure 4:
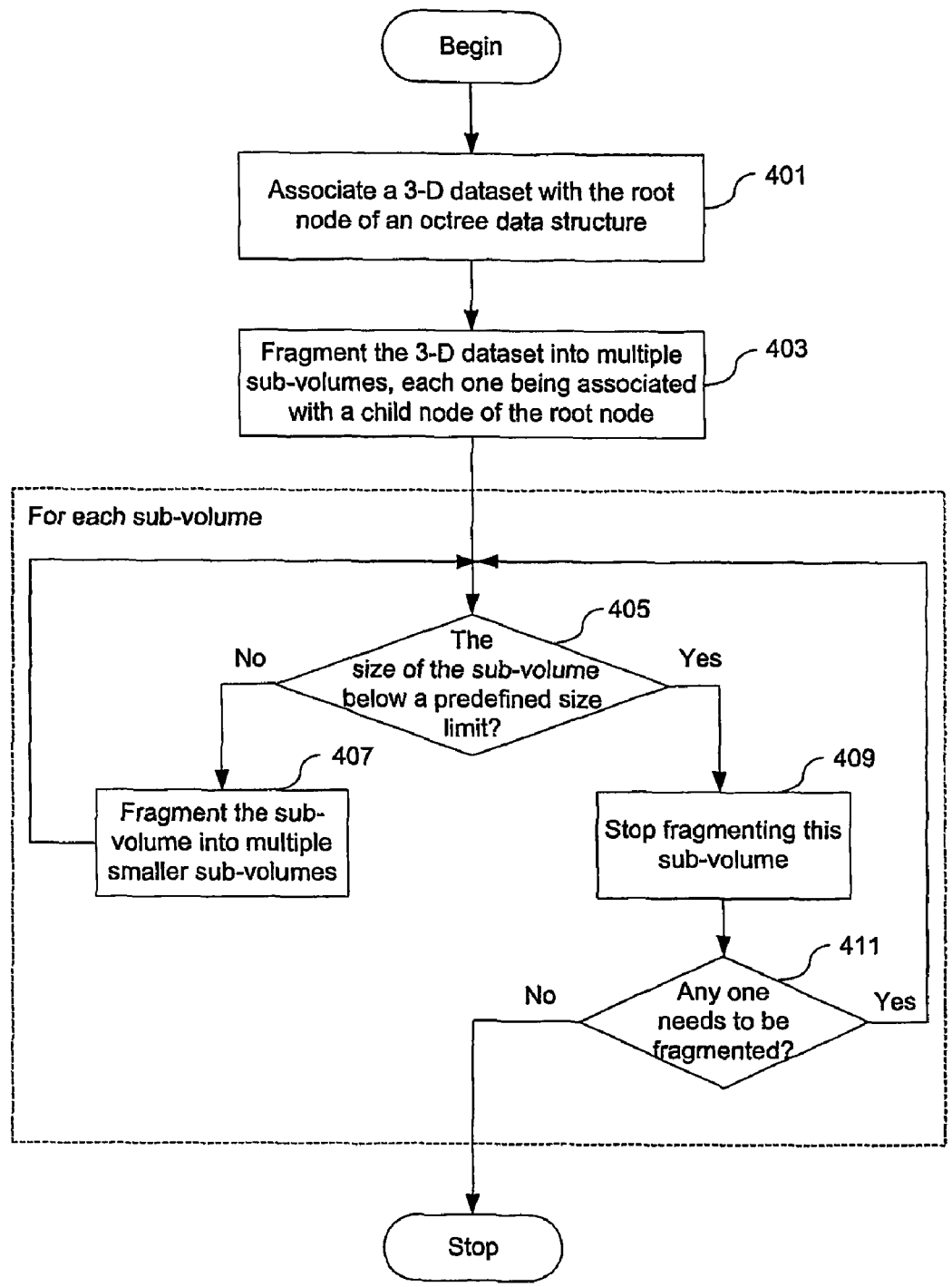
FIG. 4 is a flowchart illustrating a computer implementation of the 3-D dataset fragmentation.

FIG. 4 is a flowchart summarizing a computer program for image volume fragmentation as well as octree construction discussed above. At step 401, the computer program receives a 3-D dataset and initializes an octree data structure by associating the 3-D dataset with the root node of the octree. At step 403, the dataset is fragmented into eight sub-volumes and eight new child nodes are generated at the root node such that each sub-volume is associated with one of the eight child nodes.

Starting from step 405, each sub-volume is recursively fragmented into smaller sub-volumes until the smallest sub-volumes reach a predefined size limit. At step 405, the computer program first checks if the size of a sub-volume reaches the predefined size limit, e.g., a sub-volume of 2×2×2 cells. If not, at step 407, the sub-volume is fragmented into eight smaller sub-volumes. One of the eight smaller sub-volumes is picked and the recursive fragmentation starts at step 405 again.

If the size of a sub-volume has reached the predefined size limit, e.g., 2×2×2 cells, the computer program stops fragmenting this sub-volume at step 409 and the node of the octree associated with the sub-volume is one of the leaf nodes of the octree. At step 411, the computer program checks if there are other sub-volumes that have not been fragmented to 2×2×2 cells. If true, one of those sub-volumes is selected and the recursive fragmentation continues at step 405. Otherwise, the image volume fragmentation is terminated.

As discussed above, each sub-volume is associated with a set of data parameters such as ($V_{min}$, $V_{avg}$, $V_{max}$) for estimating a pixel value on the 2-D radiation plane. In one embodiment, after the 3-D dataset has been fragmented and the octree has been constructed, the computer starts from the leaf node level of the octree, calculating the corresponding ($V_{min}$, $V_{avg}$, $V_{max}$) of a sub-volume associated with a leaf node, such as sub-volume IV-6 in FIG. 3A. Since a sub-volume associated with a leaf node comprises only eight cells and each cell has eight data values, most of which are shared by two or more cells, the computer program only needs to retrieve 27 data values from a storage device, e.g., a hard disk, to calculate ($V_{min}$, $V_{avg}$, $V_{max}$) of the sub-volume.

After processing all the sub-volumes at the leaf node level, the computer program moves one level up on octree 304 to calculate the corresponding parameters for a sub-volume like III-6 that is associated with an intermediate node. This process continues until it reaches the root node. Since each intermediate node has eight child nodes and each child node is associated with a sub-volume whose associated data parameters have been determined previously, each data value parameter of this intermediate node can be expressed as a function of the eight parameters associated with the eight child nodes:

$$V_{min}=\text{Min}(V_{min\_1}, V_{min\_2}, \ldots, V_{min\_8});$$

$$V_{avg}=(V_{avg\_1}+V_{avg\_2}+\ldots+V_{avg\_8})/8; \text{ and}$$

$$V_{max}=\text{Max}(V_{max\_1}, V_{max\_2}, \ldots, V_{max\_8}).$$

As will be apparent, this generation of data value parameters proceeds in a direction opposite to the octree construction which starts at the root node level in a top-down fashion as shown in FIG. 3A. This bottom-up approach of data parameters generation is most efficient since it maximally reuses the calculation results at a lower level of the octree.

After step 201, a new representation of the original image volume is available for step 203 of the MIP ray casting. This representation includes an octree and a plurality of sub-volumes of different sizes, each sub-volume associated with one node of the octree and having a set of data parameters characterizing the data value distribution within the sub-volume.

3-D Adaptive MIP Ray Casting

MIP ray casting is an algorithm that generates a 2-D image revealing internal 3-D structures embedded in an image volume, and each pixel value of the 2-D image is estimated by casting a ray from the pixel into the image volume, identifying the maximum data value along the ray path and converting the maximum data value into a pixel value in accordance with a predefined screen transfer function. According to one embodiment of the present invention, an efficient 3-D adaptive MIP ray casting algorithm includes three steps:

Step one: the algorithm constructs a mathematical model for a ray having a predefined current data value record and a certain cross-section, and represents a 3-D object as a discrete 3-D dataset, each data value of the dataset representing a physical property of interest at a particular location of the object.

Step two: the algorithm compares a series of data values along the ray path with the ray's current data value record, one at a time, and replaces the current data value record if a higher data value is identified.

Step three: the algorithm converts the ray's final data value record, which is also the highest data value along the ray path, into a pixel value on a 2-D image in accordance with a predefined screen transfer function.

Figure 5:
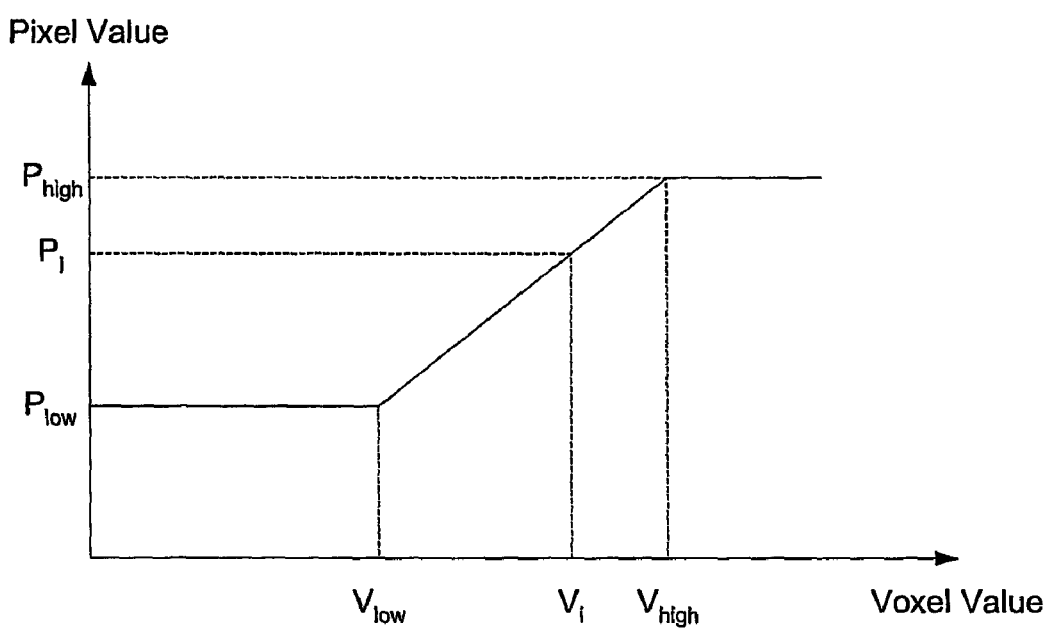
FIG. 5 schematically illustrates a series of interactions between a ray and sub-volumes of the 3-D dataset.

The screen transfer function is typically a monotonic function that is chosen arbitrarily to illuminate different aspects of the internal structure embedded in a 3-D dataset. FIG. 5 is a screen transfer function that may be used in MIP ray casting. The vertical axis represents the magnitude of pixel values on a 2-D image and the horizontal axis represents the magnitude of data values of a 3-D dataset. The screen transfer function can be divided into three sections: any data values smaller than $V_{low}$ correspond to a constant pixel value $P_{low}$, any data value greater than $V_{high}$ correspond to a constant pixel value $P_{high}$, and any data values between $V_{low}$ and $V_{high}$, e.g., V, correspond to a pixel value $P_i$ that is between $P_{low}$ and $P_{high}$.

Figure 6:
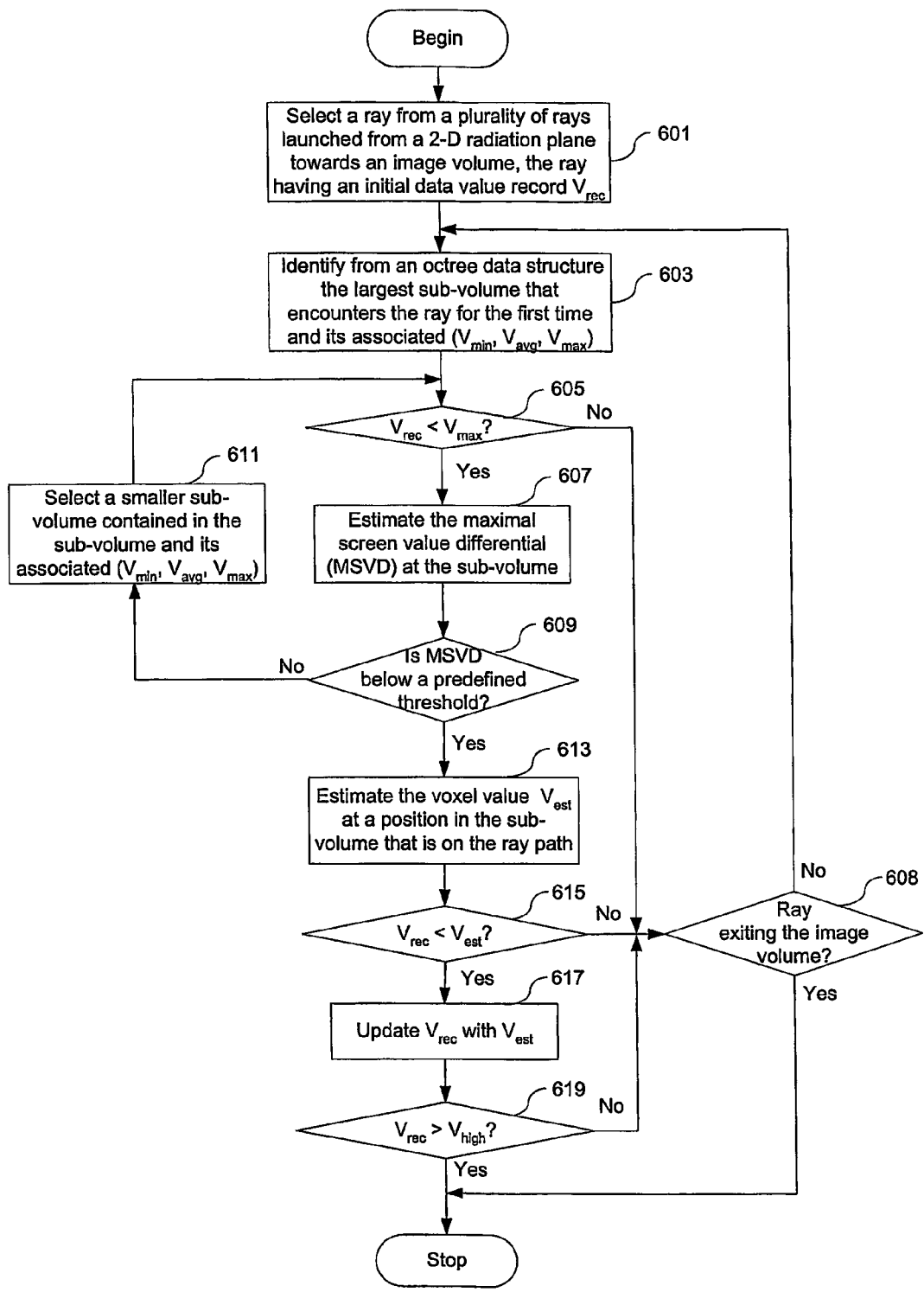
FIG. 6 is a flowchart depicting a computer program for identifying maximum data value along a ray path according to an embodiment of the present invention.

FIG. 6 is a flowchart illustrating how a computer program identifies the highest data value of an image volume along a particular ray path according to one embodiment of the present invention. Since the image volume has been fragmented into a plurality of sub-volumes that are associated with an octree as shown in FIG. 3A, each sub-volume having a set of data parameters ($V_{min}$, $V_{avg}$, $V_{max}$) characterizing the data value distribution therein, the computer program begins the identification process with the whole image volume associated with the root node of the octree for efficiency purposes.

At step 601, the computer program selects a ray from a plurality of rays launched from a 2-D radiation plane, the ray having an origin on the 2-D radiation plane, a specific orientation with respect to the image volume, and an initial current data value record $V_{rec}$. In one embodiment, the initial current data value record is set to be $V_{low}$ of the screen transfer function as shown in FIG. 5, since any data value lower than $V_{low}$ corresponds to the same pixel value $P_{low}$ on a 2-D image. As discussed below in connection with FIG. 7, this approach, when applied to the octree data structure, can effectively eliminate a significant amount of the image volume from the identification process, making the identification process more efficient.

At step 603, the computer program selects from the octree data structure the largest sub-volume that encounters the ray for the first time to check if the ray path within this sub-volume includes a point having a data value higher than the ray's current data value record $V_{rec}$. By default, the first sub-volume selected at step 603 is always the whole image volume, which has an associated set of data parameters ($V_{min}$, $V_{avg}$, $V_{max}$). However, as shown in FIG. 6, the computer program may re-visit step 603 after completing steps 608 or 619 if some conditions have been met. In this case, the computer program should have examined at least one sub-volume associated with the octree data structure, and the largest sub-volume selected at step 603 will not be the whole image volume but the sub-volume that is spatially next to a sub-volume from which the ray has just exited.

As mentioned above, the goal of the computer program is to identify the highest data value on the ray path within the image volume. However, to reduce imaging error as well as to expedite the identification process, the ray's current data value record is not replaced by a higher-value just because the sub-volume selected at step 603 has at least one data value higher than $V_{rec}$, e.g., $V_{rec} < V_{max}$. Rather, a sub-volume needs to meet three criteria to replace the ray's current data value record:

the maximum data value $V_{max}$ of the sub-volume must be higher than the ray's current data value record $V_{rec}$ (step 605), the maximum screen value differential (MSVD) within the sub-volume must be below a predefined threshold (step 609); and the data value $V_{est}$ at a predefined location on the ray path within the sub-volume, e.g., the middle point of the ray path within the sub-volume, must be higher than the ray's current data value record $V_{rec}$ (step 615).

At step 605, the computer program compares the ray's current data value record $V_{rec}$ with the maximum data value $V_{max}$ of the sub-volume selected at step 603. If $V_{rec} > V_{max}$, there is no chance for the ray's current data value record to be updated. The computer program accordingly eliminates this sub-volume and the ray keeps its current data value record when exiting the sub-volume. Note that the ray may have traveled through the whole image volume just after exiting the sub-volume. Therefore, the computer program checks if this is the last sub-volume on the ray path at step 608. If so, the computer program stops the ray casting and the ray's current data value record $V_{rec}$ will be treated as the highest data value along the ray path, which is subsequently used for estimating a corresponding pixel value on the 2-D radiation plane. Otherwise, if $V_{rec} < V_{max}$, there is at least one location in the sub-volume whose value is higher than the ray's current data value record. But it requires some further steps taken by the computer program to determine if this voxel can be used to update $V_{rec}$.

At step 607, the computer program estimates the maximum screen value differential (MSVD) of the sub-volume using the predefined screen transfer function (STF). The MSVD of a sub-volume is indicative of the impact of the data value variation within the sub-volume on the pixel value variation on the 2-D radiation plane. In one embodiment, depending upon the magnitudes of the sub-volume's associated data parameters $V_{min}$, $V_{avg}$, $V_{max}$ and the current data value record $V_{rec}$, the MSVD of the sub-volume may have slightly different definitions:

$$MSVD = MAX(STF(V_{max}) - STF(V_{avg}), STF(V_{avg}) - STF(V_{min})) \text{ if } V_{rec} < V_{min};$$

$$MSVD = MAX(STF(V_{max}) - STF(V_{avg}), STF(V_{avg}) - STF(V_{rec})) \text{ if } V_{min} < V_{rec} < V_{avg}; \text{ or}$$

$$MSVD = STF(V_{max}) - STF(V_{rec}) \text{ if } V_{avg} < V_{rec} < V_{max}.$$

Since the purpose of the identification process is to identify the highest data value on the ray path within an image volume, any voxel of a sub-volume whose value is below the current data value record $V_{rec}$ should have no bearing on the estimation of the MSVD of the sub-volume. Meanwhile, $V_{avg}$ is more accurate than $V_{max}$ and $V_{min}$ in terms of characterizing the overall data value distribution within the sub-volume, and the MSVD definition that involves $V_{avg}$ as well as $V_{max}$ and $V_{min}$ can produce more accurate images than the MSVD definition that only involves $V_{max}$ and $V_{min}$. In some alternative embodiments, the average data value $V_{avg}$ may be replaced by a median data value $V_{med}$. The median data value is the one that is higher than one half of the sub-volume's data values and lower than another half of the sub-volume's data values.

At step 609, the computer program compares the estimated MSVD with the predefined threshold. If the estimated MSVD is above the threshold, the computer program steps down along the octree data structure from the node associated with the current sub-volume and selects a smaller sub-volume that is associated with one of the child nodes (step 611). Among the multiple smaller sub-volumes associated with the child nodes, the computer program selects the one that encounters the ray ahead of all the other sub-volumes and then returns to step 605 to determine if the newly selected sub-volume is small enough to pass the test at step 609. Note that the newly selected sub-volume has its own set of data parameters ($V'_{min}$, $V'_{avg}$, $V'_{max}$) and, in particular, its maximum data value $V'_{max}$ may be smaller than the maximum data value $V_{max}$ of the parent node. If $V'_{max} < V_{rec}$, the computer program will skip this smaller sub-volume and move to step 608 as discussed above.

Following the loop including steps 605-611, the computer program may reach a leaf node of the octree data structure that is associated with a smallest sub-volume having, e.g., 2×2×2 cells. If the smallest sub-volume still fails to pass the test at step 609, the computer program may select one of the eight cells or even fragment the cell into eight sub-cells and then examine one of the sub-cells in order to pass the test at step 609. As shown in FIG. 3B, and data value at any point within a cell or sub-cell can be estimated using the eight data values at the eight corners through, e.g., tri-linear interpolation. On the other hand, a ray, according to some embodiments, is deemed to be a tube or a cone having a certain cross-section. Therefore, the fragmentation within the cell has to stop at a certain stage, e.g., if the size of a sub-cell is smaller than the cross-section of the ray within the sub-cell. If this happens, the computer program may assume the test at step 609 has been met and move forward to step 613 automatically.

Assuming that the test at step 609 has been met or the MSVD of a sub-volume (or a cell or sub-cell) is below the predefined threshold, the computer program then compares the current data value record $V_{rec}$ with an estimated data value $V_{est}$ at one point on the ray path within the sub-volume to determine whether or not $V_{rec}$ should be updated by $V_{est}$. In some embodiments, the center point of the ray path within the sub-volume is chosen for this comparison; and in some other embodiments, the computer may choose positions such as the location where the ray enters/exits the sub-volume. Since the chosen position is often not exactly one corner of a cell, the computer program often has to interpolate the data value $V_{est}$ at a specified position. To do so, the computer program at step 613 first determines which cell contains the chosen position and then retrieves the data values at the eight corners of the cell from the computer memory or hard disk to estimate the data value $V_{est}$ at that position through, e.g., tri-linear interpolation.

If $V_{rec} > V_{est}$ ("No" at step 615), the ray keeps its current data value record while exiting the current sub-volume. Note that whenever the ray exits a sub-volume, the computer program needs to check at step 608 if the ray has also exited the whole image volume. If $V_{rec} < V_{est}$ ("Yes" at step 615), the computer program replaces the current data value record $V_{rec}$ with $V_{est}$ at step 617 and $V_{est}$ becomes the ray's current data value record. Next, the computer program at step 619 compares the ray's current data value record with $V_{high}$ of the screen transfer function, because, as shown in FIG. 5, a data value record above $V_{high}$ does not have any impact on the corresponding pixel value $P_{high}$. If $V_{rec} > V_{high}$, there is no need for continuing the ray casting and the computer program terminates the ray casting immediately for this particular ray. Otherwise, the ray casting will continue. However, since the ray has just exited a sub-volume, the computer program needs to determine if the ray is outside the whole image volume first before resuming ray casting at step 603.

The adaptive MIP ray dashing algorithm shown in FIG. 6 is essentially a procedure of selecting a sequence of sub-volumes along a ray path and identifying one position in one of the sub-volumes that has the highest data value along the ray path. Since different sub-volumes are associated with different nodes of an octree data structure and characterized by different sets of data parameters ($V_{min}$, $V_{avg}$, $V_{max}$), the algorithm can adaptively eliminate those sub-volumes that are irrelevant to the goal of the MIP ray casting (e.g., at step 605) and significantly reduce the computational cost.

Figure 7:
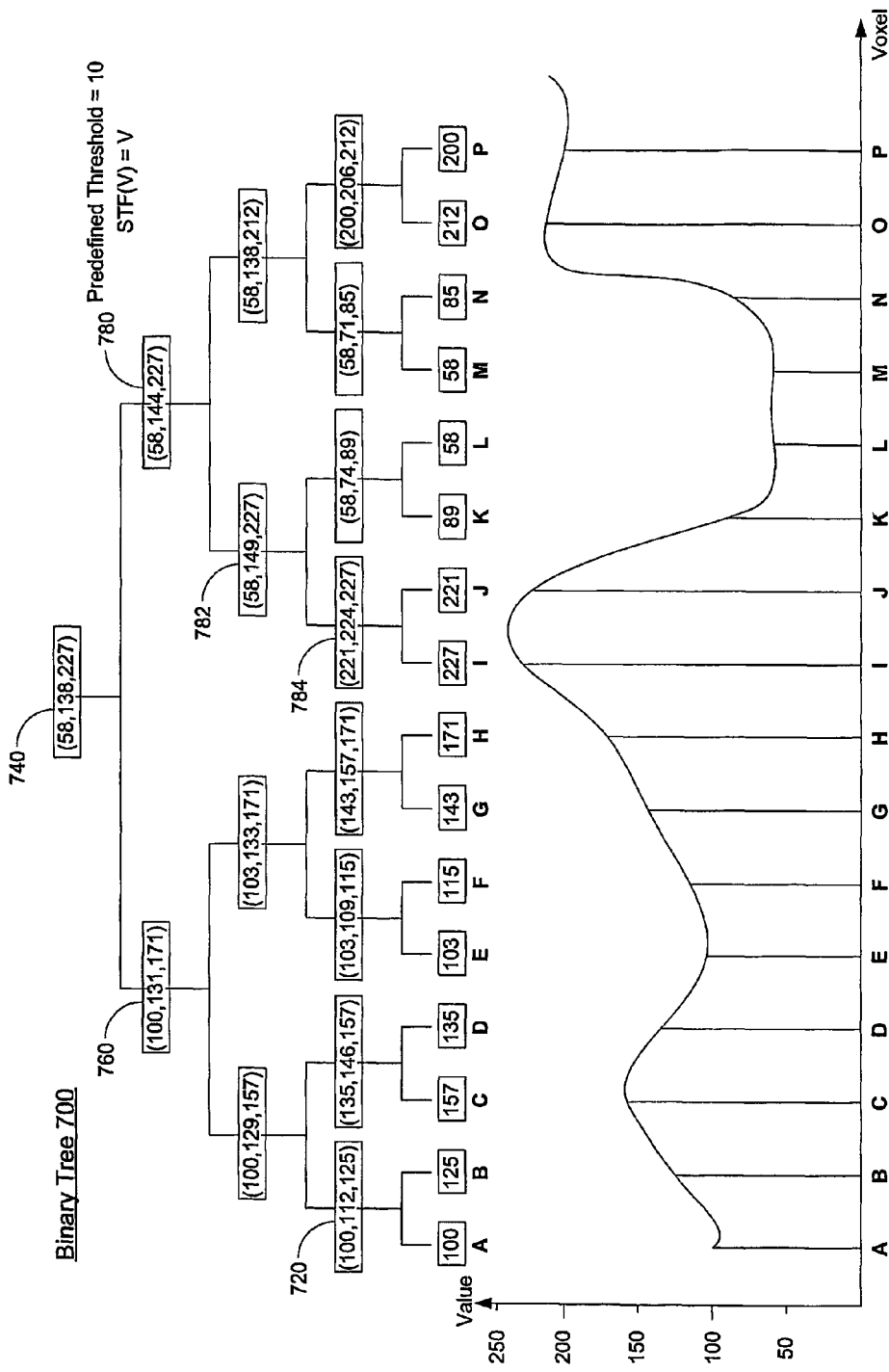
FIG. 7 presents an 1-D example illustrating the adaptive MIP ray casting according to one embodiment of the present invention.

FIG. 7 presents an 1-D example illustrating how the algorithm works in identifying a voxel having the highest value among a group of arbitrarily distributed data values according to the embodiment shown in FIG. 6. Note that the goal in 1-D is easier to accomplish than that in 2-D or 3-D, because the 2-D or 3-D version of the algorithm needs to estimate a sequence of data values on different sections of a ray path within different sub-volumes and identify the highest value among them. In contrast, the highest data value is a known to the 1-D version of the algorithm and what is unknown is the location of this highest value, while the location of the highest value on the ray path is not a concern of the 2-D or 3-D version of the algorithm (even though it is readily available).

In this example, there are sixteen data samples along the horizontal axis, A through P. For example, sample A is 100, sample J is 221 and sample N is 85, etc. An intuitive approach is to first assign the current data value record an arbitrary value (e.g., 180) and then compare it with all the sixteen data samples one by one. Whenever a sample has a higher value, the current data value record will be replaced by the higher value. This process continues until the last sample P is examined and the sample that has the highest value is identified to be sample I (227).

Apparently, the computational cost of this intuitive approach is $O(N)$, N being the number of data samples. If there are $M^2$ groups of data samples (analogous to $M^2$ ray castings required for generating a 2-D image), the total computational cost will be $O(NM^2)$. If N is a very small number, this approach might work. However, in a real-life application, e.g., CT scan image volume, N is often a large number (e.g., a few hundred or even more than a thousand), rendering $O(NM^2)$ too high to be handled by most computer systems.

Instead, a 5-level binary tree 700 is constructed such that each of the sixteen data samples is associated with one of the sixteen leaf nodes of the binary tree 700. Every non-leaf node of the binary tree 700, including the root node 740, is associated with a set of data parameters ($V_{min}$, $V_{avg}$, $V_{max}$) indicative of the minimum, average and maximum data values at the leaf nodes that are descendants of this non-leaf node. For example, node 720 has a set of data parameters (100, 112, 125), since it has only two leaf nodes whose associated values are 100 and 125, respectively, and the root node 740 has a set of data parameters (58, 138, 227), because all the sixteen leaf nodes are its descendants and among the sixteen leaf nodes, leaf node I has the highest value 227 and leaf nodes L and M have the lowest value 58.

Assuming that the initial data value record $V_{rec}$=180, $V_{low}$=180, $V_{high}$=220, respectively, the predefined threshold $T_{MSVD}$=10 and the screen transfer function STF(V)=180 if $V<V_{low}$ or V if $V_{low}<V<V_{high}$ or 220 if $V_{high}<V$. The root node is first selected to compare with $V_{rec}$ according to step 603. Since $V_{rec}$ (180) is smaller than $V_{max}$ (227) at the root node, there is at least one of the sixteen samples having an associated value higher than 180. Accordingly, the MSVD at the root node is estimated according to step 607 as (STF($V_{max}$)-STF($V_{rec}$))=227-180=47, because $V_{rec}$ (180) is larger than $V_{avg}$ (138) at the root node. Since MSVD (47) is greater than $T_{MSVD}$ (10), the computer program has to investigate a sub-group of leaf nodes by stepping one level down to one of the child nodes according to step 611. Since $V_{max}$ of the child node 760 is only 171 which is smaller than the current data value record $V_{rec}$ (180), there is no need to consider any of the eight leaf nodes that are descendants of the child node 760 according to step 605. Instead, the child node 780 is chosen since it is next to the child node 760 and its $V_{max}$ (227) is greater than $V_{rec}$ (180). This process continues until the node 784 is identified which satisfies all the three criteria discussed above and the value (227) at leaf node I is chosen to replace the current data value record (180). Note that even though there are still six leaf nodes (K to P) that are not examined, there is no need for any further investigation because the current data value record $V_{rec}$ (227) is higher than $V_{high}$ (220) and any higher value will have no impact on the resulting pixel value. Therefore, the computer program may appropriately terminate this process according to step 619.

Mathematically, the computational cost of the binary tree approach discussed above is only $O(\log_2 N)$ if the data samples are randomly distributed, which is substantially lower than the computer cost of the intuitive approach O(N). When the algorithm is extended to 3-D by fragmenting a 3-D dataset into multiple sub-volumes and associating each sub-volume with a node of an octree data structure as discussed above, the computational cost can drop substantially.

The predefined threshold used by the adaptive MIP ray casting at step 609 is a parameter affecting the efficiency and accuracy of the algorithm. Given a predefined screen transfer function, the threshold dictates how many sub-volumes the computer program needs to examine at step 609 until it finds the sub-volume that can pass the test. In other words, the larger the threshold, the more efficient the algorithm. Meanwhile, the algorithm at step 613 estimates the data value at an arbitrarily selected position, e.g., the center point of the ray path within a sub-volume, treats this estimated value as the maximum data value on the ray path within the sub-volume and compares it with the current data value record at step 615. This arbitrarily selected position, however, may not be the exact position at which the data value reaches its peak on the ray path within the sub-volume. A smaller threshold translates into a smaller sub-volume that can pass the test at step 609 and therefore a smaller error between the arbitrarily selected position and the exact position. In practice, the computer program has to strike a balance between these two competing goals, efficiency versus accuracy, by selecting an appropriate threshold.

According to one embodiment, the threshold used at step 609 is not a static value, but a dynamic one that varies from one image to another image, to generate an optimal result at a reasonable cost. Assuming that $E_0$ is an initial threshold defined by a user, a customized threshold is defined as:

$E(E_0, P_{zoom}) = E_0/\text{Sqrt}(P_{zoom})$ in the case of a parallel projection, where $P_{zoom}$ is the zoom factor indicating the physical size of an image; and $E(E_0, P_{distance}) = E_0 * \text{Log}_2(P_{distance})$ in the case of a perspective projection, where $P_{distance}$ is the distance between the ray origin and the center of the image volume.

Increasing the zoom factor $P_{zoom}$ in the case of parallel projection decreases the threshold, and the computer program needs to test more sub-volumes before identifying the maximum data value along a ray path, generating images with a higher resolution and less jitter effect. In contrast, increasing the distance $P_{distance}$ between the ray origin and the image volume in the case of perspective projection has the opposite impact on the image quality.

Besides image quality, user-friendliness is another factor when evaluating an adaptive MIP ray casting algorithm. For example, any time interval between the time the radiation plane is positioned with respect to the image volume and the image is rendered on the computer monitor is less desirable in dynamic imaging applications like cardiovascular disease diagnosis. To reduce such time delay and offer the user more control during the diagnosis process, in one embodiment, the predefined threshold can be further adjusted by the ratio between a desired frame per second (DFPS) and an actual frame per second (AFPS):

$E(E_0, P_{zoom}, \text{DFPS AFPS}) = E(E_0, P_{zoom}) * \text{DFPS/AFPS}$ in the case of a parallel projection; and $E(E_0, P_{distance}, \text{DFPS, AFPS}) E(E_0, P_{distance}) * \text{DFPS/AFPS}$ in the case of a perspective projection.

As indicated by their names, DFPS means an image rendering speed preferred by a user while AFPS is the one that is limited by the imaging system's settings such as the computer hardware, the number of pixels on the radiation plane and the image volume being processed. If the preferred image rendering speed is higher than the one offered by the system, the threshold should increase accordingly. As a result, an increased threshold achieves the user-preferred image rendering speed by compromising the image quality. On the other hand, if the preferred image rendering speed is lower than the one that the system can provide, the system may have additional capacity for lowering the threshold and generating higher-quality images at a user-acceptable speed.

2-D Image Estimation

Figure 8:
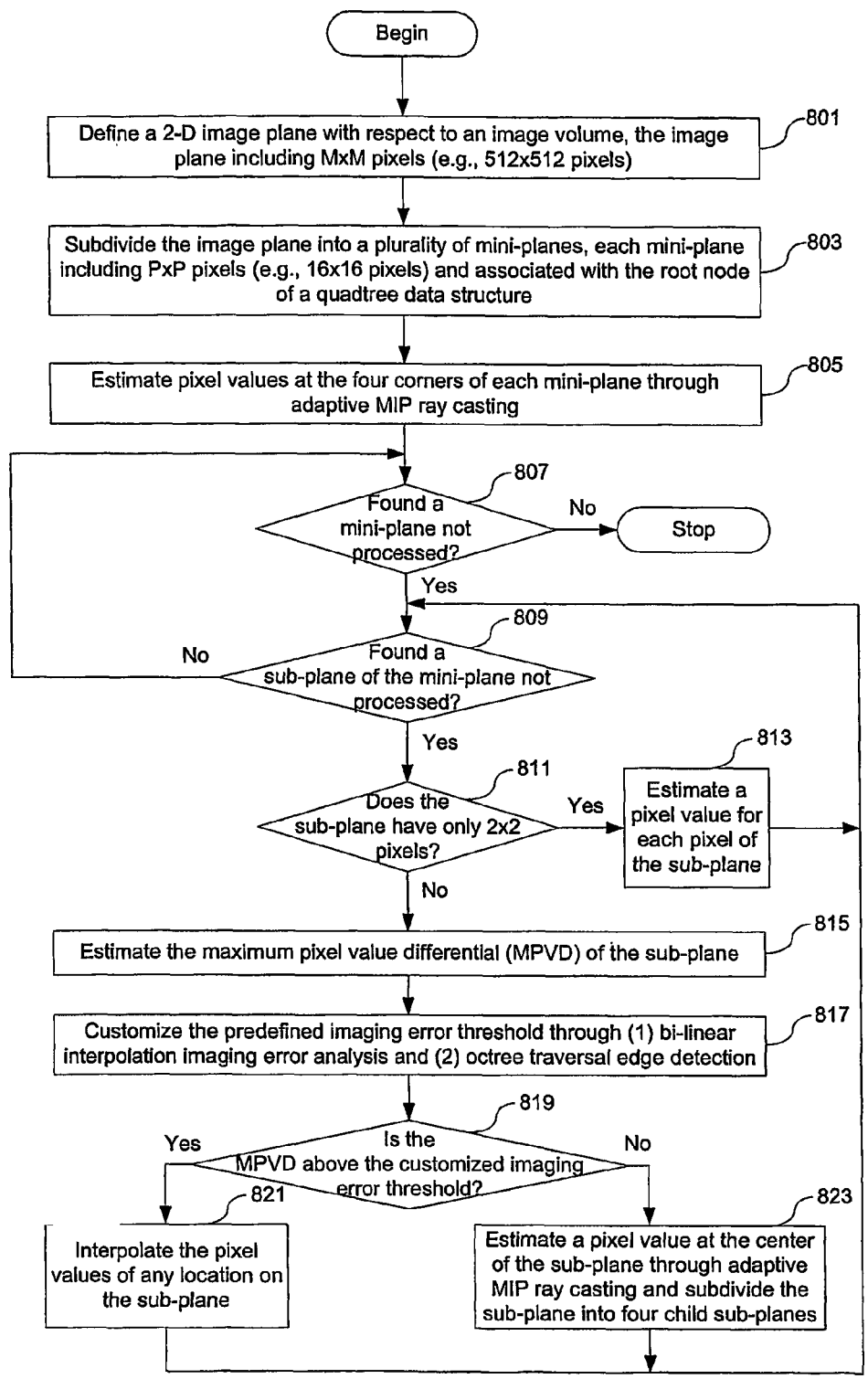
FIG. 8 is a flowchart illustrating how a computer program adaptively generates a 2-D image according to some embodiments of the present invention.

A 3-D adaptive MIP ray casting identifies the maximum data value along a ray path in an image volume and then converts it into a pixel value at a particular location on a 2-D image plane according to a predefined screen transfer function. Since the 3-D MIP adaptive ray casting is a computationally expensive operation, the efficiency of the algorithm is substantially dependent on the number of pixel values on the image plane that have to be generated through ray casting. FIG. 8 is a flowchart illustrating how a computer program adaptively determines which pixel values on the image plane need to be generated through the adaptive MIP ray casting process and which pixel values can be estimated using those generated pixel values with negligible, if not imperceptible, effects on the image quality.

At step 801, the computer program defines a 2-D image plane that is a certain distance away from and oriented in a certain direction with respect to an image volume as shown in FIGS. 1A and 1B. The image plane is usually represented by a 2-D array in the computer memory including M×M (e.g., 512×512) elements, each element of the 2-D array storing one pixel value at a corresponding location on the image plane.

At step 803, the computer program subdivides the image plane into a plurality of mini-planes of the same size, each mini-plane corresponding to a portion of the 2-D array and including P×P (e.g., 16×16) pixels. In one embodiment, a mini-plane is associated with the root node of a quadtree data structure.

At step 805, for each mini-plane created at step 803, the computer program conducts four separate adaptive MIP ray castings and estimates four pixel values at the four corners of the mini-plane.

Starting from step 807, the computer program recursively fills every element of the 2-D array with a pixel value such that, at the end of this recursive process, a 2-D image of the image volume is formed in the 2-D array. In one embodiment, the computer program adaptively subdivides a mini-plane into multiple smaller sub-planes, each sub-plane associated with one child node of the quadtree data structure and assigns each pixel of the sub-plane a pixel value through adaptive MIP ray casting or an interpolation method. More specifically, the computer program first checks if there is any mini-plane that has not been processed at step 807, i.e., if there is any mini-plane comprising at least one pixel without a pixel value. If not, every pixel of the image plane has already been assigned a pixel value and the computer program terminates. Otherwise, the computer program examines a quadtree data structure associated with a mini-plane identified at step 807 for any sub-plane that has not been processed at step 809.

If all the sub-planes associated with the quadtree data structure have been processed, the computer program returns to step 807 to process the next mini-plane. If not, the computer program at step 811 identifies a sub-plane and checks if this sub-plane comprises only 2×2 pixels. A sub-plane having only 2×2 pixels is the smallest sub-plane that a mini-plane can be subdivided into. In one embodiment, the computer program estimates a pixel value for any pixel on the sub-plane identified at step 811 through adaptive MIP ray casting at step 813. If the sub-plane identified at step 811 is larger than a sub-plane of 2×2 pixels, the computer program needs to conduct further experiments to decide how to fill the sub-plane with pixel values.

At step 815, the computer program first estimates the maximum pixel value differential (MPVD) of this sub-plane. As indicated by its name, the MPVD measures the pixel value distribution within a sub-plane. In one embodiment, the MPVD is defined as $$MPVD = MAX(|P_{avg} - P_1|, |P_{avg} - P_2|, |P_{avg} - P_3|, |P_{avg} - P_4|)/S,$$

where S is the total number of pixels within a sub-plane, $P_1$-$P_4$ are pixel values at the corners of the sub-plane and $P_{avg}$ is the average of $P_1$-$P_4$ $$P_{avg} = \frac{1}{4}(P_1 + P_2 + P_3 + P_4).$$

In some other embodiments, the average pixel value $P_{avg}$ may be replaced by the median pixel value $P_{med}$ of the sub-plane for the purpose of estimating the MPVD. The MPVD is compared with a predefined imaging error threshold for determining how to fill the remaining pixels in the sub-plane that have no associated pixel values.

Generally speaking, interpolation is a more efficient alternative than adaptive MIP ray casting and therefore should be employed whenever possible. On the other hand, a pixel value generated through adaptive MIP ray casting is more accurate than that generated through interpolation. Since different portions of the 2-D image capture different 3-D structures in the image volume and may require different levels of imaging resolution, a universal imaging error threshold across the 2-D image is not the most favorable option.

Instead, at step 817, the computer program selectively adjusts the threshold when dealing with different portions of the image volume. For example, the computer program should choose a smaller predefined imaging error threshold when rendering those portions of the 2-D image that may correspond to the edge of certain 3-D internal structure, e.g., a bone in medical imaging, which subsequently forces a sub-plane to be further fragmented into smaller sub-planes and, as a result, more pixel values in the sub-plane have to be generated through adaptive MIP ray casting instead of interpolation. More details about the customization of the predefined imaging error threshold modification are provided below in conjunction with FIG. 10.

Figure 9:
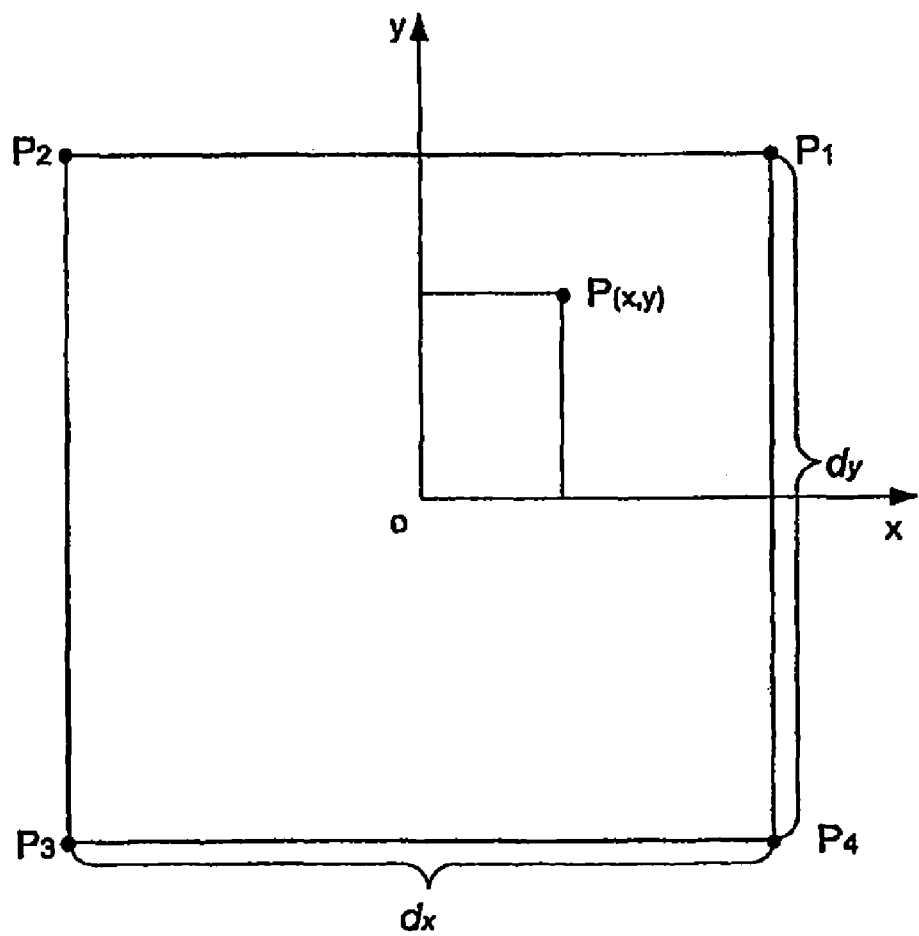
FIG. 9 presents an example of bi-linear interpolation of pixel values.

At step 819, the computer program checks if the MPVD of the sub-plane is above the customized imaging error threshold. If not, the computer program first estimates a pixel value at the center of the sub-plane through adaptive MIP ray casting and then subdivides the sub-plane into multiple smaller sub-planes at step 823, each smaller sub-plane associated with one child node of the quadtree data structure. If the MPVD is higher than the customized imaging error threshold, the computer program assigns to any unfilled pixel a value through interpolation of existing pixel values at step 821. In one embodiment, the pixel value distribution within a sub-plane is approximated by a bi-linear interpolation of the four pixel values at the corners of the sub-plane. As shown in FIG. 9, the pixel value P(x,y) at any location (x,y) can be bi-linearly interpolated as $$P(x,y) = \frac{P_1}{4}\left(1 + \frac{2x}{d_x}\right)\left(1 + \frac{2y}{d_y}\right) + \frac{P_2}{4}\left(1 - \frac{2x}{d_x}\right)\left(1 + \frac{2y}{d_y}\right) + \frac{P_3}{4}\left(1 - \frac{2x}{d_x}\right)\left(1 - \frac{2y}{d_y}\right) + \frac{P_4}{4}\left(1 + \frac{2x}{d_x}\right)\left(1 - \frac{2y}{d_y}\right).$$

After step 821 or 823, the computer program returns to step 809 to process the next sub-plane, if any. This process continues until every element of the 2-D array is allocated a pixel value corresponding to one location on the image plane that is generated through either 3-D adaptive ray casting or bi-linear interpolation. As a result, a 2-D image of the image volume is formed that can be rendered on a graphical display device such as a computer monitor.

In general, the human eye is more sensitive to the high-frequency components of an object, e.g., a 2-D image. However, bi-linear interpolation (FIG. 9) tends to smear out the high frequency components of an image because it is essentially a low-pass filter. Therefore, to capture the high-frequency components and control the total computational cost, the computer program may generate more pixel values through the more expensive adaptive MIP ray casting at certain portions while estimating most of the pixel values through bi-linear interpolation at other portions of the image plane.

As discussed above, the predefined imaging error threshold can be adjusted to control the image resolution and image rendering speed. For example, if a sub-plane does not correspond to complex internal structures or high-frequency components such as the edge of an object, the predefined imaging error threshold is raised to a high value and vice versa. However, to achieve this purpose, the computer program needs to predict whether a sub-plane being processed includes high-frequency components or not.

According to some embodiments, two methods can be used to adjust the predefined imaging error threshold to strike a balance between image quality and image rendering speed. As shown at step 817 of FIG. 8, they are:

bi-linear interpolation error analysis; and
octree traversal edge detection.

Figure 10A:
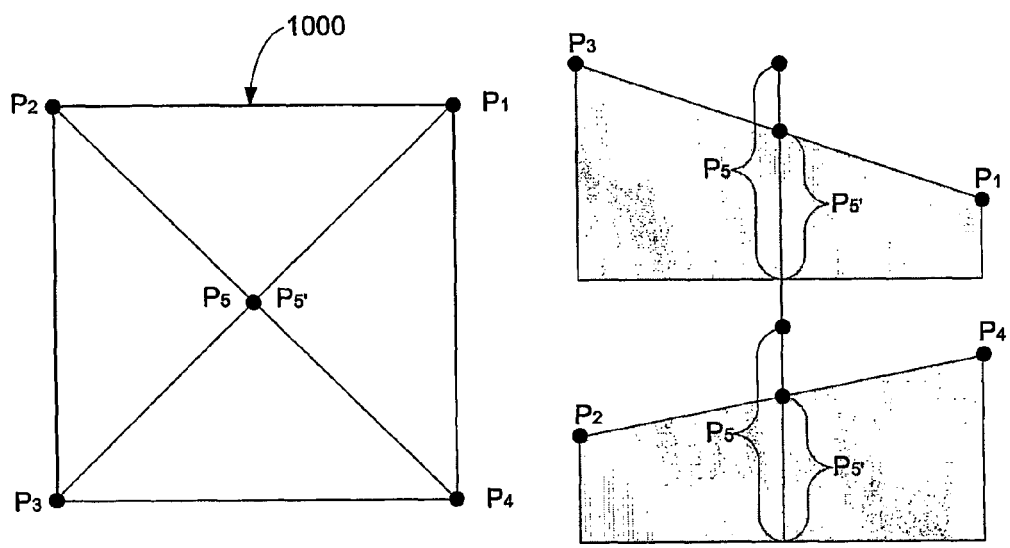
FIGS. 10A and 10B illustrate two methods of adjusting a predefined imaging error threshold.

As shown in FIG. 10A, a sub-plane 1000 has four known pixel values $P_1$-$P_4$ at its four corners that are generated through adaptive MIP ray casting. Therefore, the bi-linearly interpolated pixel value $P_{5'}$ at the center of the sub-plane 1000 is $$P_{5'} = \frac{1}{4}(P_1 + P_2 + P_3 + P_4).$$

Meanwhile, the computer program also generates a pixel value $P_5$ through adaptive MIP ray casting at the center of the sub-plane 1000 when it is subdivided into four smaller sub-planes. The absolute difference between the two pixel values $|P_5-P_{5'}|$ shows how accurate the result of bi-linear interpolation is within this sub-plane 1000. For example, a higher absolute difference not only means the sub-plane needs to be further subdivided, but also suggests that there may be high-frequency components within the sub-plane. The computer program, accordingly, may significantly lower the imaging error threshold to fully capture the 3-D characteristics of the internal structures within the sub-plane. On the other hand, a smaller absolute difference suggests that the image within sub-plane is smooth and the predefined imaging error threshold may be increased accordingly to reduce the computational cost without substantially degrading the image resolution.

Octree traversal edge detection is a method of adjusting the imaging error threshold by examining the size difference between a sub-volume or a cell or a sub-cell that has been identified as including the maximum data value and an image plane to catch a smaller 3-D object or the sharp edge of a 3-D object embedded within an image volume.

Figure 10B:
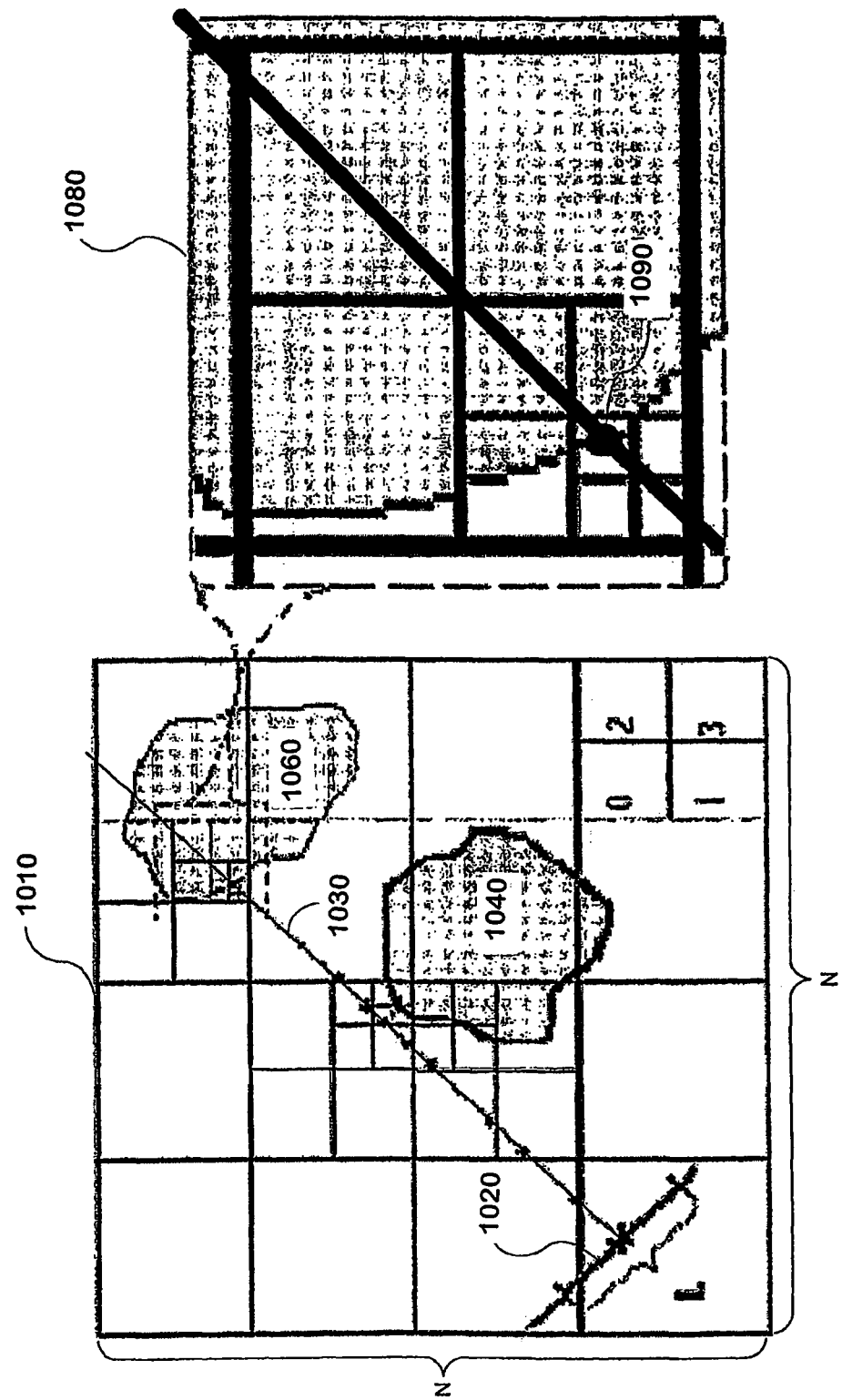

For simplicity, FIG. 10B depicts a 2-D dataset 1010 that comprises at least two objects 1040 and 1060 and the 2-D dataset includes N×N pixels. Inside the dataset is an image line 1020 that comprises L pixels. Along the ray path 1030 are a series of sub-planes of different sizes that have met at least one of the criteria as shown in FIG. 6 (steps 605, 609 and 615, respectively). A zoom-in view 1080 depicts details of the 2-D dataset surrounding a sub-plane in which the computer program identifies the maximum data value 1090 along the ray path 1030. Assuming that the fragmentation level of the sub-plane containing the maximum data value is Q, a factor Z indicating the existence of small objects or sharp edges of an object near the ray path is defined as:

$$Z = L - \frac{N}{2^Q}.$$

A higher Q (i.e., a smaller sub-plane) results in a higher Z factor, suggesting that there may be some small objects along the ray path 1030, and the predefined imaging error threshold should be lowered accordingly so as not to miss those small objects or sharp edges along the ray path. On the other hand, a lower Q (i.e., a larger sub-plane) results in a lower Z factor, indicating that it is less possible to identify small objects along the ray path, and the predefined imaging error threshold can be increased without losing significant details on the image line 1020. Note that the Z factor is useful in adjusting the predefined imaging error threshold when the ray exits the dataset without being early terminated inside the dataset.

Finally, the predefined imaging error threshold can also be adjusted according to the ratio of desirable frame per second and actual frame per second. If the former is higher than the latter, the predefined imaging error threshold may increase so that more image frames can be rendered than the system's default capability with a slight loss of image resolution; otherwise, the predefined imaging error threshold may decrease if the former is lower than the latter.

Computer System

Figure 11:
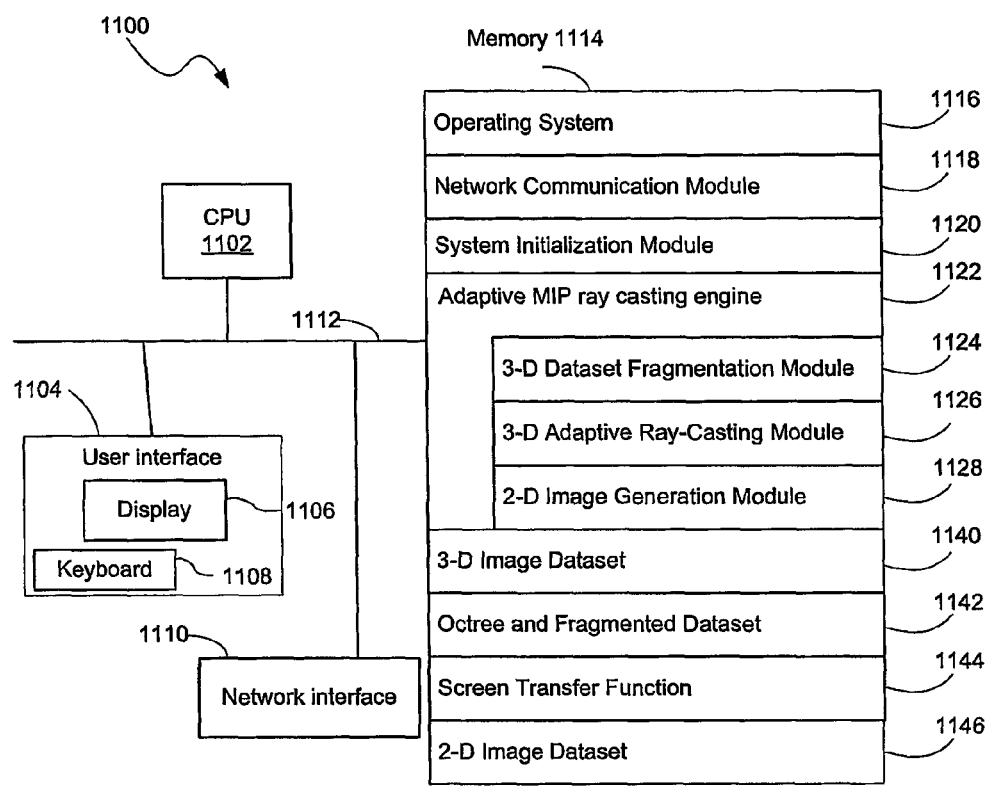
FIG. 11 is a block diagram of an adaptive MIP ray casting system according to one embodiment of the present invention.

The adaptive MIP ray casting method discussed above can be implemented in a regular computer system and does not need any special hardware support. FIG. 11 illustrates such a system 1100 in accordance with some embodiments of the present invention. An adaptive MIP ray casting system 1100 typically comprises one or more central processing units (CPU's) 1102, memory 1114, and one or more communication buses 1112 for interconnecting the various components of system 1100. The adaptive MIP ray casting system 1100 also includes a user interface 1104, including, for example, a display device 1106 for displaying 2-D images of a 3-D dataset and a keyboard 1108 for receiving a user's image rendering requirements. The system 1100 may optionally include a network or other communications interface 1110 for retrieving 3-D datasets from remote storage devices or transmitting rendering results to remote clients.

Memory 1114 includes high-speed random access memory and may also include non-volatile memory, such as one or more magnetic disk storage devices (not shown). The memory 1114 may also include mass storage that is remotely located from the central processing unit(s) 1102. The memory 1114 preferably stores:

- an operating system 1116 that includes procedures for handling various basic system services and for performing hardware dependent tasks;
- a network communication module 1118 that is used for connecting system 1100 to various security devices or client computers (not shown) and possibly to other servers or computers via one or more communication networks (wired or wireless), such as the Internet, other wide area networks, local area networks, metropolitan area networks, and so on;
- a system initialization module 1120 that initializes other modules and data structures stored in memory 1114 required for the appropriate operation of system 1100;
- an adaptive volume rendering engine module 1122 that generates 2-D images of a 3-D dataset and renders it on display device 1106;
- a 3-D dataset 1140 and a corresponding Octree structure 1142 representing the fragmented 3-D dataset;
- a 2-D image dataset 1146 and a corresponding Quadtree structure representing the fragmented 2-D image; and
- a screen transfer function table 1144 that converts a data value of the 3-D dataset into a pixel value of the 2-D image dataset.

The MIP ray casting engine 1122 includes executable procedures, sub-procedures, and other data structures supporting the image generating process, such as:

- a 3-D dataset fragmentation module 1124 that fragments a 3-D dataset into multiple sub-volumes, estimates a set of data value parameters for each sub-volume, constructs an octree data structure and associates the sub-volumes with various nodes on the octree data structure;
- a 3-D adaptive MIP ray casting module 1126 that selects a series of sub-volumes that interact with a ray based on a set of predefined criteria and then identifies the maximum data value along the ray path; and
- a 2-D image rendering module 1128 that subdivides a 2-D image plane into multiple mini-planes, each mini-plane being associated with a quadtree data structure, and invokes the 3-D adaptive ray casting module 1126 selectively to constructs a 2-D image of the 3-D dataset.

As shown in FIG. 8, during the 2-D image construction, the system 1100 first subdivides an image plane into a plurality of mini-planes and then processes each mini-plane recursively, associating every pixel in the mini-plane with a pixel value through bi-linear interpolation or adaptive MIP ray casting, if necessary. At the end, a single 2-D image is formed in the memory 1114. Since the imaging result of one mini-plane is independent from that of another mini-plane, the adaptive MIP ray casting algorithm is actually a parallel algorithm that can be implemented on a parallel computer or a cluster of computers.

Figure 12:
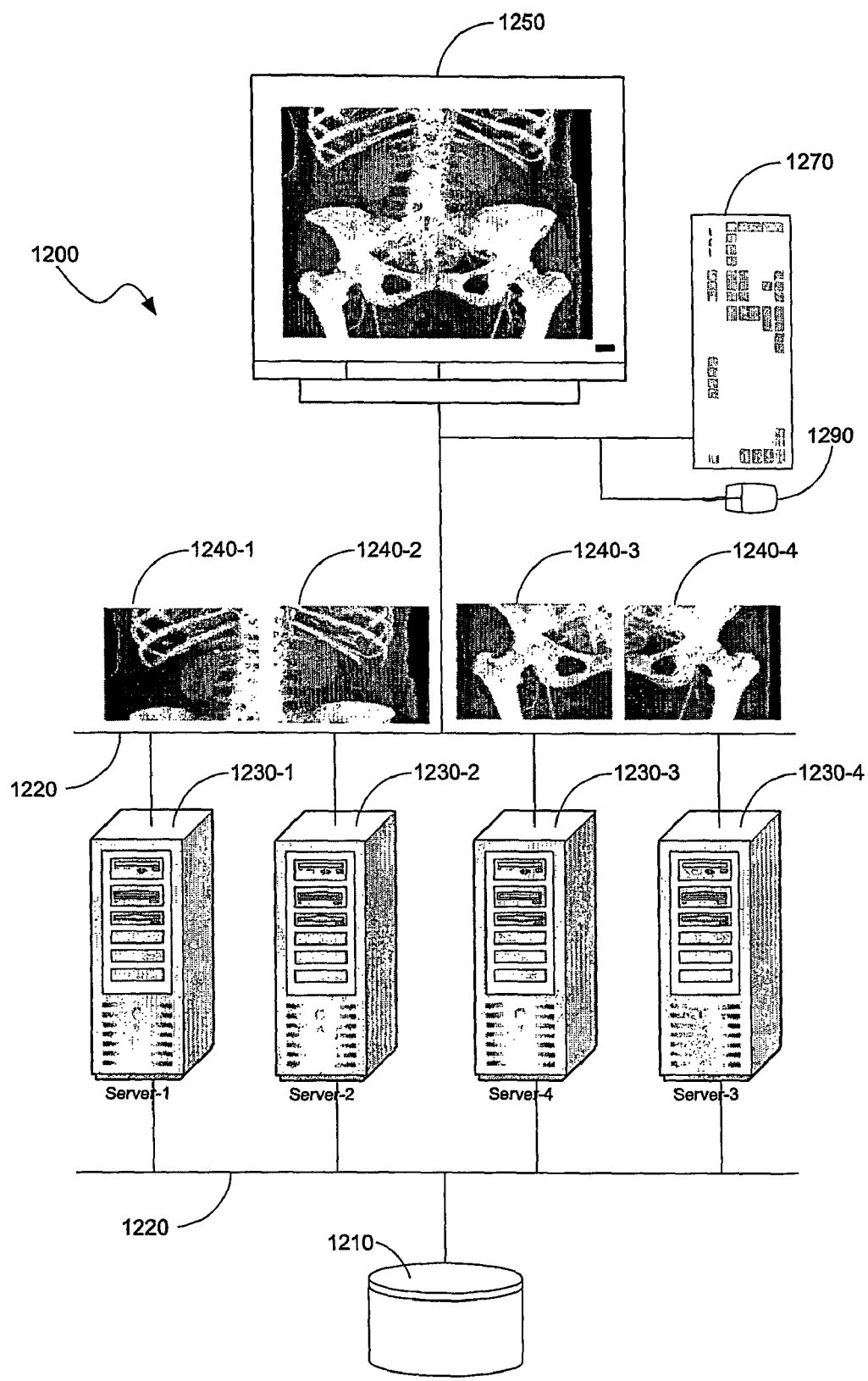
FIG. 12 is a block diagram of the adaptive MIP ray casting rendering system implemented a computer cluster according to one embodiment of the present invention.

FIG. 12 illustrates one embodiment of the present invention that employs a computer cluster 1200. The cluster 1200 comprises:

- a data storage device 1210, e.g., a hard disk, that stores one or more image volumes;
- a plurality of computer servers 1230-1, 1230-2, 1230-3, and 1230-4, each server preferably having one or more CPUs and its own memory storing the direct volume rendering software;
- a computer monitor 1250 for displaying the images generated by the cluster;
- a keyboard 1270 and a mouse 1290 for receiving the command and rendering parameters from a user; and
- a communication bus 1220 connecting the various components.

Illustratively, there are four servers 1230-1, 1230-, 1230-3, and 1230-4 in the cluster 1200, and each server is responsible for generating a quarter of the final image, as indicated by the partial images 1240-1, 1240-2, 1240-3, and 1240-4. Within each server, the job may be further partitioned between different CPUs, if there is more than one CPU per server. After all the partial images 1240-1 through -4 have been generated, one of the servers assembles the partial images into a complete image and renders it on the monitor 1250.

EXAMPLES

Figure 13A:
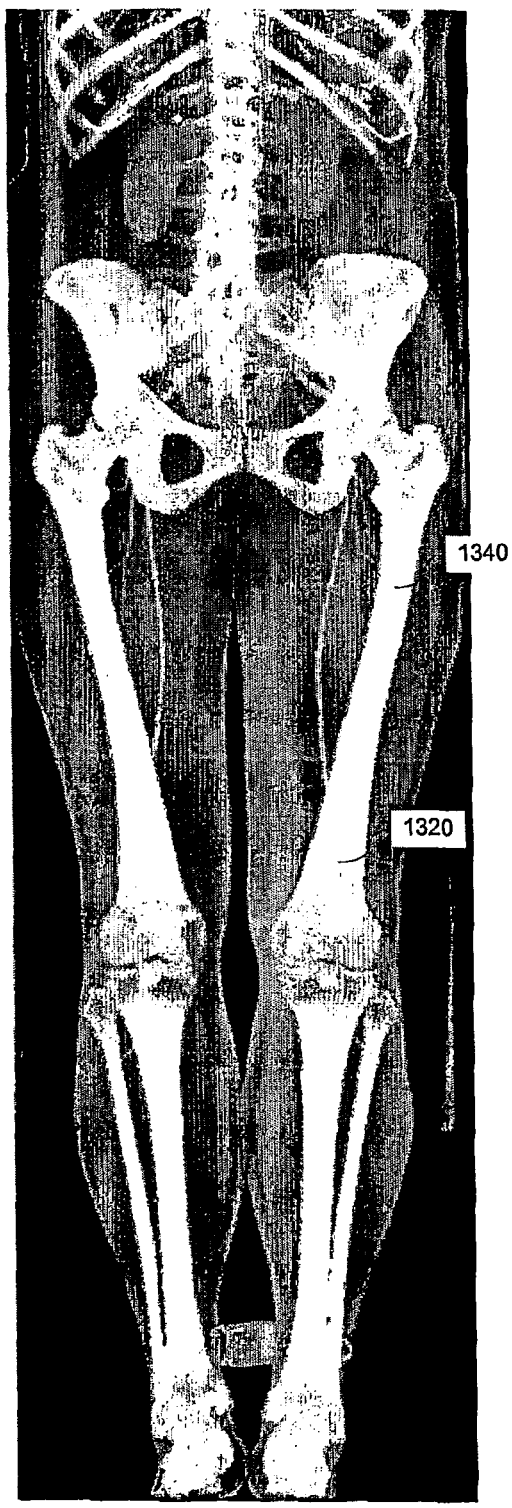
FIG. 13 shows two images of a human body through different versions of adaptive MIP ray casting algorithm according to one embodiment of the present invention.
Figure 13B:
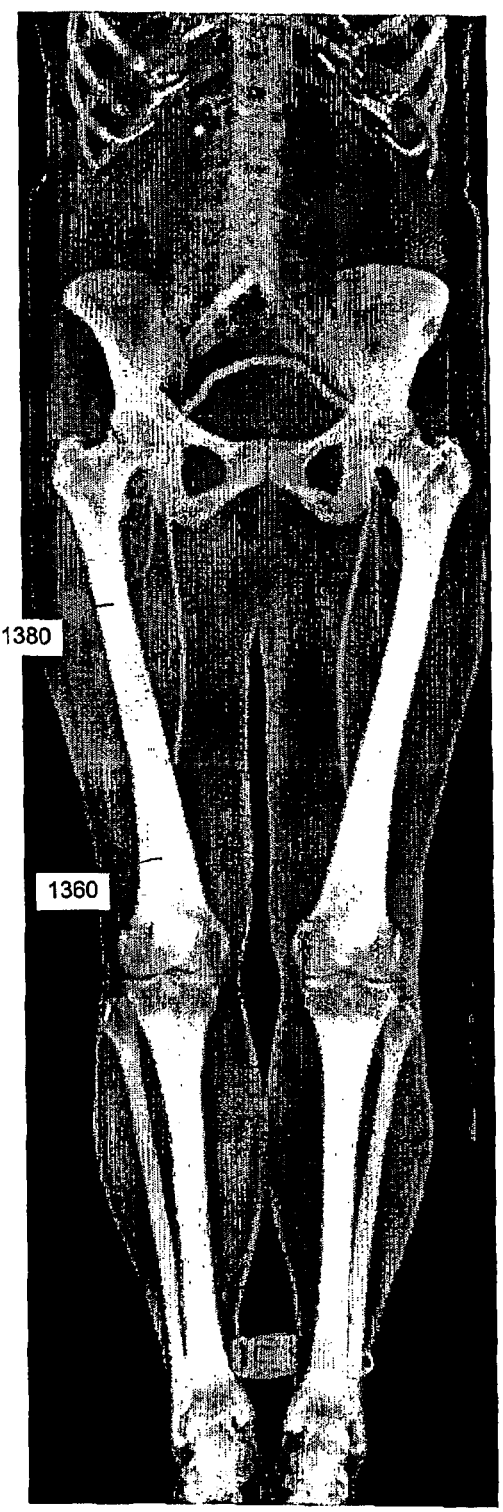

FIGS. 13A and 13B provide an example of two images generated from a 3-D CT scan dataset using adaptive MIP ray casting according to one embodiment the present invention. The two images are substantially similar except that a pixel value in FIG. 13A is only dependent upon its respective maximum data value identified along the ray path according to a predefined screen transfer function, while a pixel value in FIG. 13B is further weighted by the distance between the image plane and the location of the maximum data value in the image volume. As a result, the same maximum data values identified at different parts of the image volume may cause different pixel values on the image of FIG. 13B, offering certain 3-D perspectives to the viewer. For example, the two image sections 1320 and 1340 of the femur bone in FIG. 13A have virtually the same brightness, while the same two sections 1360 and 1380 in FIG. 13B have different brightness. In particular, since section 1360 is farther away from the viewer than section 1380, it looks slightly dimmer when compared with section 1380.

The foregoing description, for purpose of explanation, has been set forth with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of adaptive maximum intensity projection ray casting, comprising:

fragmenting a sampled 3-D dataset of a scalar field into a plurality of sub-volumes of different sizes, each sub-volume associated with a set of data value parameters characterizing the data value distribution of the scalar field within the sub-volume;

defining a screen transfer function that is dependent upon data values of the scalar field;

selectively casting a plurality of rays towards the sampled dataset, each ray having an initial data value record and a cross-section, wherein the step of selectively casting is performed on a computer processor and comprises, for each ray,
  selecting a subset of the plurality of sub-volumes that are located along a path of the ray;
  identifying the maximum data value on the ray path that is within the selected subset; and
  converting the maximum data value into a pixel value in a 2-D image plane according to the screen transfer function; and using the pixel values determined for the cast rays to estimate other pixel values at other locations in the 2-D image plane wherein the step of selectively casting a plurality of rays towards the sampled dataset comprises:

subdividing the 2-D image plane into a plurality of mini-planes; and
  for each of the plurality of mini-planes,
    estimating four pixel values at the four corners of the mini-plane; and
    recursively subdividing the mini-plane into multiple sub-planes, and estimating pixel values at centers of the sub-planes by casting rays towards the sampled dataset until the maximum pixel value differential of each sub-plane is below a predefined imaging error threshold; and wherein the predefined threshold is modulated by an image rendering speed specified by a user and a zoom factor in the case of parallel projection or a perspective angle and a perspective distance between the image plane and the sampled dataset in the case of perspective projection.

* * * * *